United States Patent
Kobayashi et al.

(10) Patent No.: US 7,515,190 B2
(45) Date of Patent: Apr. 7, 2009

(54) PORTABLE IMAGING DEVICE INCLUDING DISPLAY CONTAINING FUNCTION EXPLANATION

(75) Inventors: Satoru Kobayashi, Tokyo (JP); Toshio Masuda, Tokyo (JP)

(73) Assignee: Hoya Corporation, Tokyo (JP)

( * ) Notice: Subject to any disclaimer, the term of this patent is extended or adjusted under 35 U.S.C. 154(b) by 804 days.

(21) Appl. No.: 11/046,864

(22) Filed: Feb. 1, 2005

(65) Prior Publication Data
US 2005/0195293 A1 Sep. 8, 2005

(30) Foreign Application Priority Data
Feb. 2, 2004 (JP) ............................ 2004-025460

(51) Int. Cl.
*H04N 5/222* (2006.01)
(52) U.S. Cl. .................................. 348/333.01
(58) Field of Classification Search ................. 348/135, 348/333.01, 207.1
See application file for complete search history.

(56) References Cited
U.S. PATENT DOCUMENTS
7,319,490 B2 * 1/2008 Kanamori et al. ........... 348/375

2002/0149621 A1* 10/2002 Yamaguchi et al. ......... 345/764
2003/0038849 A1* 2/2003 Craven et al. .............. 345/864

FOREIGN PATENT DOCUMENTS

| JP | 5-308571 | 11/1993 |
| JP | 2002-084439 | 3/2002 |
| JP | 2002-123349 | 4/2002 |
| JP | 2002123349 A * | 4/2002 |

\* cited by examiner

*Primary Examiner*—David L Ometz
*Assistant Examiner*—Usman Khan
(74) *Attorney, Agent, or Firm*—Greenblum & Bernstein, P.L.C.

(57) ABSTRACT

A portable imaging device has a memory which stores a device image. This device image shows a part of an outside of the portable image device itself including a plurality of selectable portions relating to the control members of the portable image device. The device image is read and is indicated on the LCD of the portable image device. With the portable image at least one of characters is indicated on the LCD. The characters correspond to selectable portions. One of the selectable portions is selected as a selected portion. The selected portion is distinguished from other selectable portion by the characters. The function relating to the selected portion is indicated on the LCD.

20 Claims, 19 Drawing Sheets

TABLE 1

| | PRIMARY HELP IMAGE | FIELD A | SELECTED PORTION | FIELD B | FIELD C1 | FIELD C2 | SELECTED POSITION IMAGE 150 | CONTROL ID |
|---|---|---|---|---|---|---|---|---|
| PHOTOGRAPH HELP MODE | R11 | FIRST CAMERA IMAGE 107 | 1 (EASY) | CHAR. A IMAGE 120 | | | | R11 (1) |
| | | | 2 (PORTRAIT) | CHAR. B IMAGE 121 | | | | R11 (2) |
| | | | 3 (LANDSCAPE) | CHAR. C IMAGE 122 | | | | R11 (3) |
| | | | 4 (NIGHT-SCENE) | CHAR. D IMAGE 123 | FIRST HEADER IMAGE 130 | | | R11 (4) |
| | | | 5 (MOVIE) | CHAR. E IMAGE 124 | | | | R11 (5) |
| | | | 6 (SOUND-RECORD) | CHAR. F IMAGE 125 | | | | R11 (6) |
| | | | 7 (FILTER) | CHAR. G IMAGE 126 | | FIRST FOOTER IMAGE 141 | | R11 (7) |
| | | | 8 (PROGRAM) | CHAR. H IMAGE 127 | | | | R11 (8) |
| | | | 9 (PICTURE) | CHAR. I IMAGE 128 | | | | R11 (9) |
| | R12 | SECOND CAMERA IMAGE 108 | 1 (RIGHT BUTTON) | FOUR-WAY CONTROLLER CHAR. IMAGE 135 | SECOND HEADER IMAGE 131 | | RIGHT BUTTON SELECTED | R12 (1) |
| | | | 2 (UP BUTTON) | | | | UP BUTTON SELECTED | R12 (2) |
| | | | 3 (LEFT BUTTON) | | | | LEFT BUTTON SELECTED | R12 (3) |
| | | | 4 (OK BUTTON) | | | | OK BUTTON SELECTED | R12 (4) |
| | | | 5 (DOWN BUTTON) | | | | DOWN BUTTON SELECTED | R12 (5) |
| | R13 | THIRD CAMERA IMAGE 109 | 1 (HELP/Fn BUTTON) | BACK BUTTON CHAR. IMAGE 136 | THIRD HEADER IMAGE 132 | | HELP/Fn BUTTON SELECTED | R13 (1) |
| | | | 2 (ZOOM BUTTON) | | | | ZOOM BUTTON SELECTED | R13 (2) |
| | | | 3 (DISP BUTTON) | | | | DISP BUTTON SELECTED | R13 (3) |
| | | | 4 (MENU BUTTON) | | | | MENU BUTTON SELECTED | R13 (4) |

FIG. 9

TABLE 2

| | SECONDARY HELP IMAGE | SELECTED PORTION | FIELD A+B | FIELD C1 | FIELD C2 | CONTROL ID |
|---|---|---|---|---|---|---|
| PHOTOGRAPH HELP MODE | R21 | 1 (EASY) | EXPLANATION IMAGE R21 (1) FOR FUNCTION OF EASY MODE | | | R21 (1) |
| | | 2 (PORTRAIT) | EXPLANATION IMAGE R21 (2) FOR FUNCTION OF PORTRAIT MODE | | | R21 (2) |
| | | 3 (LANDSCAPE) | EXPLANATION IMAGE R21 (3) FOR FUNCTION OF LANDSCAPE MODE | | | R21 (3) |
| | | 4 (NIGHT-SCENE) | EXPLANATION IMAGE R21 (4) FOR FUNCTION OF NIGHT-SCENE MODE | | | R21 (4) |
| | | 5 (MOVIE) | EXPLANATION IMAGE R21 (5) FOR FUNCTION OF MOVIE MODE | | | R21 (5) |
| | | 6 (SOUND-RECORD) | EXPLANATION IMAGE R21 (6) FOR FUNCTION OF SOUND-RECORD MODE | | | R21 (6) |
| | | 7 (FILTER) | EXPLANATION IMAGE R21 (7) FOR FUNCTION OF FILTER MODE | | | R21 (7) |
| | | 8 (PROGRAM) | EXPLANATION IMAGE R21 (8) FOR FUNCTION OF PROGRAM MODE | | | R21 (8) |
| | | 9 (PICTURE) | EXPLANATION IMAGE R21 (9) FOR FUNCTION OF PICTURE MODE | | | R21 (9) |
| | R22 | 1 (RIGHT BUTTON) | EXPLANATION IMAGE R22 (1) FOR FUNCTION OF RIGHT BUTTON | | SECOND FOOTER IMAGE 142 | R22 (1) |
| | | 2 (UP BUTTON) | EXPLANATION IMAGE R22 (2) FOR FUNCTION OF UP BUTTON | | | R22 (2) |
| | | 3 (LEFT BUTTON) | EXPLANATION IMAGE R22 (3) FOR FUNCTION OF LEFT BUTTON | | | R22 (3) |
| | | 4 (OK BUTTON) | EXPLANATION IMAGE R22 (4) FOR FUNCTION OF OK BUTTON | | | R22 (4) |
| | | 5 (DOWN BUTTON) | EXPLANATION IMAGE R22 (5) FOR FUNCTION OF DOWN BUTTON | | | R22 (5) |
| | R23 | 1 (HELP/Fn BUTTON) | EXPLANATION IMAGE R23 (1) FOR FUNCTION OF HELP/Fn BUTTON | | | R23 (1) |
| | | 2 (ZOOM BUTTON) | EXPLANATION IMAGE R23 (2) FOR FUNCTION OF ZOOM BUTTON | | | R23 (2) |
| | | 3 (DISP BUTTON) | EXPLANATION IMAGE R23 (3) FOR FUNCTION OF DISP BUTTON | | | R23 (3) |
| | | 4 (MENU BUTTON) | EXPLANATION IMAGE R23 (4) FOR FUNCTION OF MENU BUTTON | | | R23 (4) |

FIG. 10

TABLE 3

| | PRIMARY HELP IMAGE | FIELD A | SELECTED PORTION | FIELD B | FIELD C1 | FIELD C2 | SELECTED POSITION IMAGE 150 | CONTROL ID |
|---|---|---|---|---|---|---|---|---|
| REPLAY HELP MODE | P11 | FOURTH CAMERA IMAGE 156 | 1 (RIGHT BUTTON) | FOUR-WAY CONTROLLER CHAR. IMAGE 162 | SECOND HEADER IMAGE 131 | FIRST FOOTER IMAGE 141 | RIGHT BUTTON SELECTED | P11 (1) |
| | | | 2 (UP BUTTON) | | | | UP BUTTON SELECTED | P11 (2) |
| | | | 3 (LEFT BUTTON) | | | | LEFT BUTTON SELECTED | P11 (3) |
| | | | 4 (OK BUTTON) | | | | OK BUTTON SELECTED | R11 (4) |
| | | | 5 (DOWN BUTTON) | | | | DOWN BUTTON SELECTED | P11 (5) |
| | P12 | FIFTH CAMERA IMAGE 151 | 1 (DELETE BUTTON) | BACK BUTTON CHAR. IMAGE 163 | THIRD HEADER IMAGE 132 | | DELETE BUTTON SELECTED | P12 (1) |
| | | | 2 (REPLAY BUTTON) | | | | REPLAY BUTTON SELECTED | P12 (2) |
| | | | 3 (HELP/Fn BUTTON) | | | | HELP/Fn BUTTON SELECTED | P12 (3) |
| | | | 4 (ZOOM BUTTON) | | | | ZOOM BUTTON SELECTED | P12 (4) |
| | | | 5 (DISP BUTTON) | | | | DISP BUTTON SELECTED | P12 (5) |
| | | | 6 (MENU BUTTON) | | | | MENU BUTTON SELECTED | P12 (6) |

FIG. 11

TABLE 4

| | SECONDARY HELP IMAGE | SELECTED PORTION | FIELD A+B | FIELD C1 | FIELD C2 | CONTROL ID |
|---|---|---|---|---|---|---|
| REPLAY HELP MODE | P21 | 1 (RIGHT BUTTON) | EXPLANATION IMAGE P21 (1) FOR FUNCTION OF RIGHT BUTTON | | | P21 (1) |
| | | 2 (UP BUTTON) | EXPLANATION IMAGE P21 (2) FOR FUNCTION OF UP BUTTON | | | P21 (2) |
| | | 3 (LEFT BUTTON) | EXPLANATION IMAGE P21 (3) FOR FUNCTION OF LEFT BUTTON | | | P21 (3) |
| | | 4 (OK BUTTON) | EXPLANATION IMAGE P21 (4) FOR FUNCTION OF OK BUTTON | | | P21 (4) |
| | | 5 (DOWN BUTTON) | EXPLANATION IMAGE P21 (5) FOR FUNCTION OF DOWN BUTTON | | | P21 (5) |
| | P22 | 1 (DELETE BUTTON) | EXPLANATION IMAGE P22 (1) FOR FUNCTION OF DELETE BUTTON | | SECOND FOOTER IMAGE 142 | P22 (1) |
| | | 2 (REPLAY BUTTON) | EXPLANATION IMAGE P22 (2) FOR FUNCTION OF REPLAY BUTTON | | | P22 (2) |
| | | 1 (HELP/Fn BUTTON) | EXPLANATION IMAGE P22 (3) FOR FUNCTION OF HELP/Fn BUTTON | | | P22 (3) |
| | | 2 (ZOOM BUTTON) | EXPLANATION IMAGE P22 (4) FOR FUNCTION OF ZOOM BUTTON | | | P22 (4) |
| | | 5 (DISP BUTTON) | EXPLANATION IMAGE P22 (5) FOR FUNCTION OF DISP BUTTON | | | P22 (5) |
| | | 6 (MENU BUTTON) | EXPLANATION IMAGE P22 (6) FOR FUNCTION OF MENU BUTTON | | | P22 (6) |

PORTABLE IMAGING DEVICE INCLUDING DISPLAY CONTAINING FUNCTION EXPLANATION

BACKGROUND OF THE INVENTION

1. Field of the Invention

The present invention relates to a portable imaging device, for example a digital camera, a portable phone, and a video camera, that can indicate an explanation for the function of a control member on the displaying device.

2. Description of the Related Art

A portable imaging device having a displaying device, such as a digital camera, a portable phone, and a video camera, comprises many various functions. In order to use these many various functions, the portable imaging device for example the digital camera has to have many control members. In this digital camera, it is difficult for a user to understand the function of the control members. Therefore, the user of the digital camera must see an instruction manual to understand and use the functions of the control members.

Conventionally, in order to understand the function of the control members, a system using a personal computer is known as shown in Japanese Unexamined Patent Publication (KOKAI) NO.2002-123349. In this system, the digital camera is connected to the personal computer, and then when the control member is operated by the user the explanation of the function of the operated control member is displayed on a displaying device of the personal computer.

However, when the user carries the digital camera, he does not usually carry an instruction manual or a personal computer. Therefore, the user can not use the functions he does not understand without the instruction manual or a personal computer. Hence, the various functions which the digital camera has, are not sufficiently utilized.

Furthermore, the displaying device of the portable image device such as digital camera has a far smaller displaying field and a far lower quality of image than that of a personal computer. Accordingly, the displaying device of the portable image device can not be used instead of that of the personal computer. Namely, the system using a computer can not be applied to the microcomputer and the displaying device of the portable imaging device.

SUMMARY OF THE INVENTION

Therefore, an object of the present invention is to provide a portable imaging device, which can inform users of the functions of its control members without the use of another additional device such as personal computer.

According to the present invention, there is provided a portable imaging device, having a control member for controlling the portable imaging device and a displaying device for displaying images. The portable imaging device has a memory, a reading processor, a first indicating processor, a selection indicating processor, and a second indicating processor. The memory stores a device image showing at least apart of an outside of the portable imaging device. The device image includes a plurality of selectable portions relating to control members. The reading processor reads the device image from the memory. The first indicating processor indicates a first image which shows a character corresponding to at least one of the plurality of selectable portions, and the device image which is read by the reading processor, on the displaying device. The selection indicating processor indicates that a selected portion has been selected from the plurality of selectable portions using the character. The second indicating processor indicates a second image showing a function relating to the selected portion on the displaying device.

Preferably, the selection indicating processor indicates the selected portion to distinguish the selected portion from other portions. In this case, the selection indicating processor can indicate characters corresponding to the selected portion and does not indicate other characters corresponding to the selectable portions.

When the second indicating processor indicates the second image, preferably the first image and device image are not indicated on the displaying device.

When the first indicating processor indicates all characters corresponding to the plurality of selectable portions, preferably, the first indicating processor distinguishes one character corresponding to the selected portion from all the characters.

When the portable imaging device is in one selected mode which is selected from a plurality of modes, preferably, the function corresponds to the selected mode. The plurality of modes includes a photograph mode for photographing and a replay mode for displaying an image photographed in the photograph mode on the displaying device for example. Preferably, the plurality of selectable portions is changed according to the selected mode.

When the memory stores a plurality of device images, preferably, the reading processor reads one of the plurality of device images. In this case, if the portable imaging device is in one selected mode which is selected from some modes, preferably, the reading processor reads the device images according to the selected mode. Further, the selectable portions may be determined according to which device image is read. Furthermore, the first image may include a text character corresponding to at least one of the plurality of selectable portions.

When an indicating field on which the displaying device displays an image is divided into at least first and second fields, the first indicating processor indicates the device image in the first field and the first image in the second field. In this case, the first field is located at the closet position on the displaying device to where the control member included in the device image is located, and preferably the second image is adjacent to the first image. The first field can include a right side of the indicating field. Preferably, the second indicating processor indicates the second image in a third field which is bigger than each of the first and second fields. More preferably, the third field is a combination of the first and second fields.

BRIEF DESCRIPTION OF THE DRAWINGS

The objects and advantages of the present invention will be better understood from the following description, with reference to the accompanying drawings in which:

FIG. 4 is an outline, showing the details of a photograph help mode;

FIG. 8 is Table 1, used in the photograph help mode;

FIG. 9 is Table 2, used in the photograph help mode;

FIG. 10 is Table 3, used in the replay help mode;

FIG. 11 is Table 4, used in the replay help mode.

DESCRIPTION OF THE PREFERRED EMBODIMENTS

Figure 1:
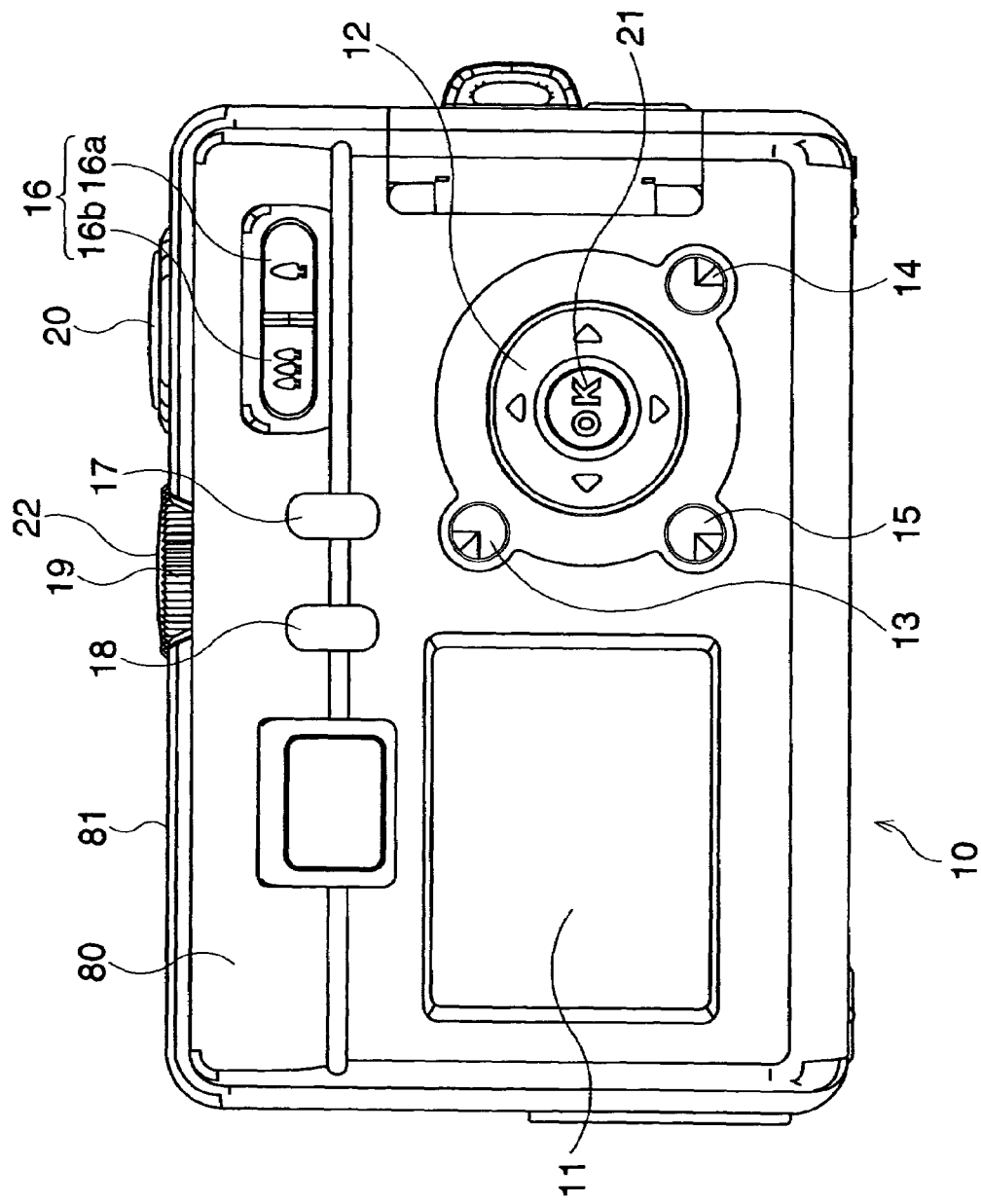
FIG. 1 is a back plan view, showing a digital camera.

The present invention will be described below with reference to the embodiments shown in the drawings.

FIG. 1 shows the digital camera in the first embodiment. The digital camera 10 has a back surface 80 and an upper surface 81. The digital camera 10 is provided with a displaying device (LCD) 11 at the left side on the back surface 80. The moving image or still image which is photographed by the digital camera 10is displayed on the LCD 11. The back surface 80 is provided with a four-way controller 12 on the right side of the LCD 11. The four-way controller 12 consists of right, left, up, and down buttons. An OK button 21 is provided at the center of the four-way controller 12.

A help/Fn button 13, a DISP button 14, and menu button 15 are provided around the four-way controller 12. A zoom button 16 is provided above the four-way controller 12 on the back surface 80. The zoom button 16 consists of a telephoto button 16a and a wide button 16b. If the telephoto button 16a or the wide button 16b is pushed, the size of the image indicated on the LCD 11 is increased or decreased for example. On the left side of the zoom button 16, a replay button 17 and a delete button 18 are provided in sequence from right.

The upper surface 81 is provided with a release button 20, a mode dial 19, and a power button 22. The release button 20 and the mode dial 19 are located in sequence from right when the digital camera 10 is seen from the back surface 80 side. The power button 22 is located in the center of the mode dial 19. The power ON-OFF of the digital camera 10 is changed if the power button 22 is pushed.

All control members that are related with selectable portions as described below, namely the four-way controller 12, the OK button 21, the help/Fn button 13, the DISP button 14, the menu button 15, the zoom button 16, the replay button 17, the delete button 18, the mode dial 19, and the release button 20, are located on the right side of the displaying device 11, when the digital camera 10 is seen from the back surface 80 side.

Figure 2:
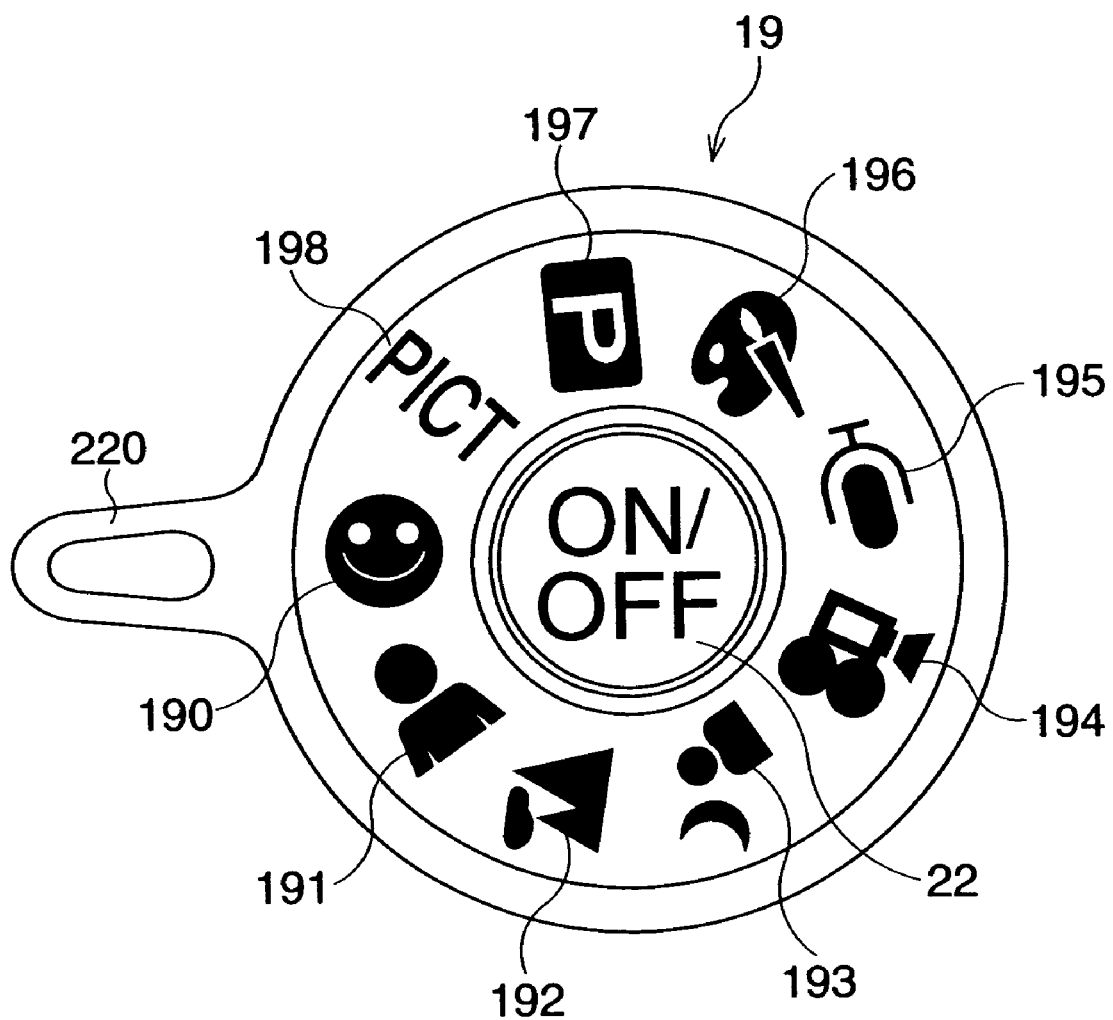
FIG. 2 shows a enlarged plan view of a mode dial.

FIG. 2 shows an enlarged plan view of the mode dial 19. Nine symbol marks are applied on the upper surface of the mode dial 19. The nine symbol marks are Easy Symbol 190, Portrait Symbol 191, Landscape Symbol 192, Night-scene Symbol 193, Movie Symbol 194, Sound-Record symbol 195, Filter Symbol 196, Program Symbol 197, and Picture Symbol 198. The mode dial 19 is rotated and the photograph detail mode is determined according to the mode corresponding to the symbol mark pointed to by a pointer 220.

Figure 3:
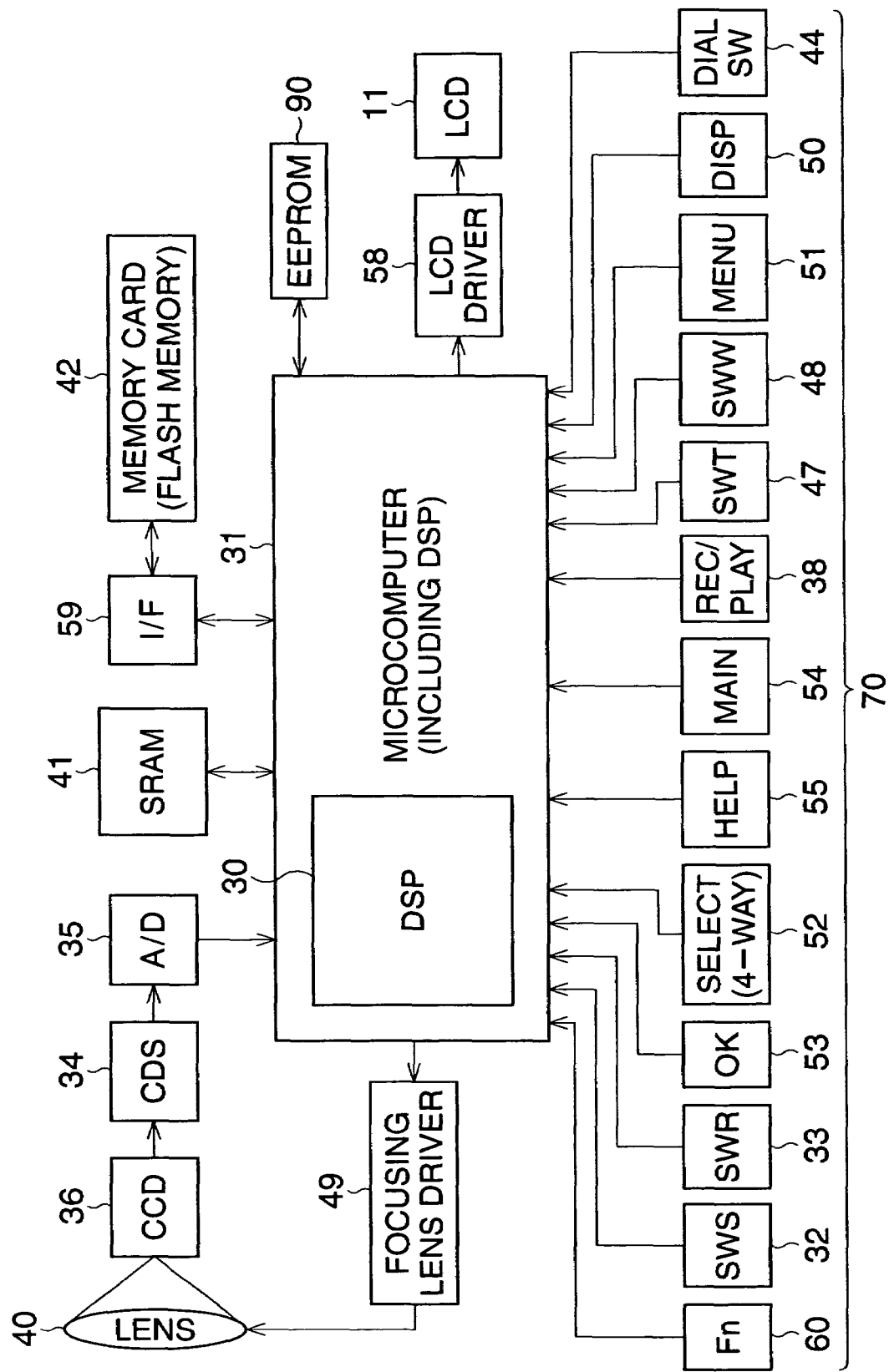
FIG. 3 is a block diagram of the digital camera.

FIG. 3 is a block diagram of the digital camera 10. The digital camera 10 is provided with a microcomputer 31 including a DSP (Digital Signal Processor) 30. The microcomputer 31 controls the digital camera 10, so that an image photographed by the digital camera 10 can be displayed on the LCD 11, and can be recorded in a memory card 42. The microcomputer 31 is connected to a switch group 70. The microcomputer 31 is controlled based on inputs from the switch group 70. The switch group 70 consists of switches as described below.

The digital camera 10 is in the selected mode which is selected from a replay mode or a photograph mode. A REC/PLAY switch 38 switches the replay mode to or from the photograph mode by the replay button 17 pushed. If the selected mode is in the photograph mode, the photograph detail mode is further selected by the mode dial 19 as described above. Namely, the photograph detail mode is selected from an easy mode, a portrait mode, a landscape mode, a night-scene mode, a movie mode, a sound-record mode, a filter mode, a program mode, and a picture mode. When the digital camera 10 is changed to a different photograph detail mode, the detail setting is different. For example, in the easy mode the digital camera takes a still picture based on the ordinary setting. On the other hand, in the portrait mode, the digital camera 10 takes a still picture based on the settings which are suitable for the portrait photographing. Further, when the digital camera 10 is in a photograph mode, not in a sound-record mode, the digital camera 10 can take a still picture or a moving picture.

When the digital camera 10 is in the photograph mode (for example in the easy mode), the digital camera 10 can photograph a moving image of an object and can indicate the moving image of an object as described below. Namely, reflected light from an object is received at a CCD 36 through a lens 40. At the CCD 36 the received light is changed to analog signals corresponding to the received light. The analog signals are sent to an A/D converter 35 through a CDS (Correlated Double Sampling) circuit 34. At the A/D converter 35, the analog signals are converted to digital signals. The digital signals are input to the microcomputer 31. The digital signals are processed according to a predetermined image processing so as to convert them to an image data. The number of image pixels of the image data, is reduced so that the image data is converted to display image data. The display image data is initially stored in an SRAM 41 and then is sent to the LCD 11 through an LCD driver 58. The display image data is displayed on the LCD 11 as a moving image.

Further, in the photograph mode (for example in the easy mode), the digital camera 10 takes a still picture if the release button 20 is fully-pushed as described below. Namely, when the release button 20 is half-pushed, the SWS switch 32 is changed to the ON-state. Due to this, the object's luminance is detected and the distance between the digital camera 10 and the object is measured. If the release button 20 is fully-pushed, the SWR switch 33 is changed to the ON-state and a photograph of the object is taken as a still picture based on the detected luminance and the measured distance.

Namely, initially the exposure of the digital camera 10 is corrected and the lens 40 is adjusted by a focusing lens driver 49. After that the CCD 36 receives the reflected light from the object through the lens 40 based on the corrected exposure, and then the digital image signals which are generated at the CCD 36 based on the reflected light, are sent to the microcomputer 31. At the microcomputer 31 the digital image signals are processed according to a predetermined image processing so as to convert them to image data. The image data is sent to the memory card 42 through an interface 59. The image data is stored in the memory card 42 as recorded image data. The number of image pixels that are in the recorded image data which is stored the memory card 42, is not reduced. Further, the image data is stored as a screennail in the memory card 42. The number of image pixels of the image data stored as the screennail, is reduced.

In the replay mode, the screennail which is stored in the memory card 42 is displayed on the LCD 11. Usually the memory card 42 stores many pieces of recorded image data and many screennails corresponding to the recorded image data. Therefore, one screennail selected from many stored screennails is displayed on the LCD 11. The selected screennail is changed according to the input from a select switch 52 by pushing the right or left buttons of the four-way controller 12. Further, the select switch 52 consists of four switches corresponding to the four-way controller 12.

If the telephoto button 16a or the wide button 16b is pushed, a SWT switch 47 or a SWW switch 48 respectively changed to the ON-state. If either the SWT switch 47 or the SWW switch 48 is in the ON-state, the microcomputer 31 may drive the lens 40 using the focusing lens driver 49 or may change the scale of the still image or moving image displayed on the LCD 11 using the DSP 30 according to the situation. Due to these, when the SWT switch 47 is in the ON-state the scale of the screennail in the replay mode or the moving image in the photograph mode becomes bigger on the LCD 11. Similarly, when the SWW switch 48 is in the ON-state, the scale of the screennail or the moving image becomes smaller on the LCD 11.

By pushing the DISP button 14, the ON-state and OFF-state of a DISP switch 50 are changed. If the DISP switch 50 is in the ON-state, the power for the LCD 11 is in the ON-state and the image is displayed on the LCD 11. If the DISP switch 50 is in the OFF-state, the power for the LCD 11 is in the OFF-state and nothing is displayed on the LCD 11.

By pushing the menu button 15, the ON-state and OFF-state of a menu switch 51 is changed. If the menu switch 51 is in the ON-state, the digital camera is in a set-up mode. In the set-up mode, the set-up matter is changed and fixed according to input from the select switch 52 and an OK switch 53. Further, the OK switch 53 is activated by pushing the OK button 21.

A dial switch 44 is a switch group which consists of nine switches, and one switch is selected from the switch group according to the dial position of the mode dial 19. The selected switch is the only one in the ON-state. For example, when the pointer 220 (as shown in FIG. 2) points to the portion where the Easy Symbol 190 is located, the easy mode switch is in the ON-state and the other switches, such as the portrait mode switch, a landscape mode switch, etc., are in the OFF-state.

By pushing the power button 22, the ON-state and OFF-state of a main switch 54 are changed. If the main switch 54 changes from the OFF-state to the ON-state, the power supply to the digital camera 10 starts and the digital camera 10 starts working. If the main switch 54 changes from the ON-state to the OFF-state, the power supply stops and the digital camera 10 stops working.

When the digital camera 10 is in the replay mode or in the easy mode, the digital camera 10 can enter a help mode as described below. On the other hand, when the digital camera 10 is in a mode other than the above modes, the digital camera 10 can not enter the help mode. Therefore, in the replay mode or in the easy mode if the help/Fn button 13 is pushed, a help switch 55 is activated. After activating the help switch 55, the digital camera 10 enters the help mode. When the digital camera 10 is in an other mode, an Fn switch 60 is activated if the help/Fn button 13 is pushed.

An EEPROM (Electronically Erasable Programmable Read Only Memory) 90 is connected to the microcomputer 31. In the EEPROM 90, the images (for example camera images, character images, explanation images etc.) which are indicated on the fields A, B, C1, and C2 in the help mode as shown in FIG. 4, the table data as shown in FIG. 8-11, the necessary data for working the camera and so on, are stored in advance.

When the digital camera 10 enters the help mode, the Tables 1-4 shown in FIGS. 8-11 and the images which are indicated on the fields A, B, C1, and C2 in the help mode are read from the EEPROM 90, and are stored in a predetermined area of the SRAM 41 by the microcomputer 31. Further, if the storage capacity of the SRAM 41 is large enough, these tables and images may be stored in the SRAM 41 when the digital camera 10 starts working.

Figure 4:
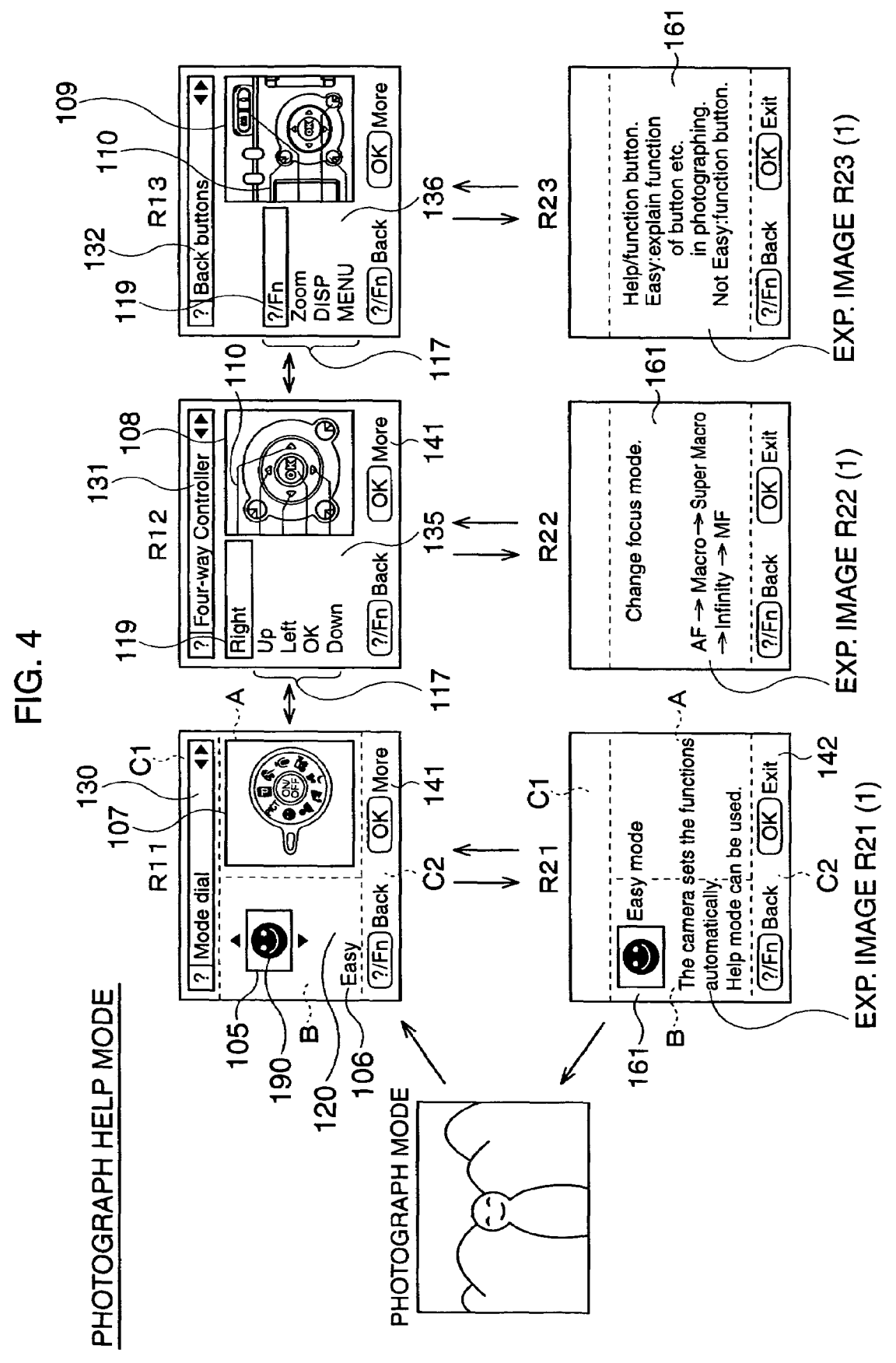

FIG. 4 is a view, showing the details of a photograph help mode. The photograph help mode is entered when the help switch 55 is activated in the easy mode. In the photograph help mode, a primary help image R11 is indicated on the LCD 11 at first.

The image indicated on the LCD 11 is changed to or from the primary help image R11, R12, or R13 according to the selection using the right or left button of the four-way controller 12. On the primary help image R11-R13, a plurality of portions relating to the control members are indicated. The portions are the zoom button 16, DISP button 14, and the menu button 15 for example.

In each of the primary help images R11, R12, and R13, one selected portion is selected from the plurality of portions by a user. The user selects one selected portion using the up or down button of the four-way controller 12.

At this time, if the OK switch 53 is activated, a secondary image R21, R22, or R23 is indicated on the LCD 11 instead of the help image R11, R12, or R13. The secondary images R21, R22, and R23 explain the function relating to the selected portion. Namely, at first the user selects one of the selected portions from the plurality of portions relating to the control member, next the user fixes the selected portions by activating the OK switch 53, and finally the function of the selected portion selected by the user, is explained by the secondary image R21, R22, or R23. Further, in this case the portions which can be selected are determined as selectable portions in advance.

The LCD 11 has an indicating field which can indicate the image. The indicating field is divided into an image indicating field (first field) A, a character indicating field (second field) B, a header field C1, and a footer field C2 in the help mode. The header field C1 is located in an upper part of the indicating field. The footer field C2 is located at a lower part of the indicating field. In this case, each of the fields C1 and C2 occupies very narrow area. Therefore, a center field between the fields C1 and C2 occupies almost all of the indicating field. The center field is divided into two fields, the fields A and B. The field A occupies the right half side of the center field. The field B occupies the left half side of the center field.

A camera image (device image) which shows a part of the outside of the digital camera 10 is indicated in the image indicating field A. Regarding the camera image, the outside part includes control members. The camera image is indicated as a first, second, and third camera images 107, 108, and 109 on the primary help image R11, R12, and R13 respectively. The first, second and third camera image 107, 108, and 109 respectively shows the mode dial 19, the four-way controller 12, and the back button group, as control members. The back button group consists of all the buttons which are provided on the back surface 80 of the digital camera 10.

All control members that are related with all selectable portions are located at right side of the LCD 11. On the other hand, the field A occupies almost all of the field from the center line to the right end line of the indicating field of the LCD 11. And the field A includes a right side of the indicating field. Namely, the field A is the closest to the positions where the control members included in the camera images 107, 108, and 109, are located.

A character image is indicated in the character image field B. The character image has characters corresponding to at least one of the selectable portions. A title which is indicated in the header field C1 relates to the control members included in the camera image 107, 108, or 109. In this embodiment, the title is the name of the control member. Therefore, "Mode Dial", "Four-way Controller", and "Back Buttons" are indicated in the primary help image R11, R12, and R13 respectively.

In the photograph help image, the positions which can be selected are stored in the SRAM 41 as shown in Table 3. Namely, the selectable portions are stored in the SRAM 41 (as shown in FIG. 3) as pre-selectable portions in advance. The selectable portions are read from the SRAM 41 according to which of the primary help images is indicated on the LCD 11. The first camera image 107 in help image R11, shows the upper surface of the mode dial 19 which has nine portions where a different symbol mark is applied. And then, these nine portions are read as the selectable portions when the primary help image R11 is indicated. Namely, all selectable portions are shown in the camera image 107 when the help image R11 is indicated. In this case, one selected portion is selected from the nine selectable portions. When the primary help image R11 is read, the selected portion is selected automatically at first. And then, the selected portion is changed among the nine selectable portions when a user pushes the up and down buttons.

The primary help image R11 includes a symbol frame 105 on the character image. A symbol mark (i.e. pictogram) corresponding to the selected portion is indicated in the symbol frame 105. A letter 106 is indicated under the symbol frame 105 in order to describe what the symbol mark in the symbol frame 105 means. For example, when the selected portion is the portion where the "Easy Symbol" is applied, "Easy Symbol" is indicated in the symbol frame 105 and the word "Easy" is indicated in letters 106. And other characters corresponding to the selectable portions are not indicated. Due to this, the user can understand that the selected portion is the portion where the "Easy Symbol" is applied.

In this case, if the down button of the four-way controller 12 is pushed, the selected portion is changed to the portion where "Portrait Symbol" is applied. And then, "Portrait Symbol" is indicated in the symbol frame 105 and "Portrait" is indicated in letters 106.

The second camera image 108 shows the four-way controller 12 and OK button 21. Therefore, when the primary help image R12 is indicated on the LCD 11, the up, down, right, and left buttons of the four-way controller 12 and OK button 21 are read as selectable portions from the SRAM 41. The third camera image 109 shows the back button group. Therefore, when the primary help image R13 is indicated on the LCD 11, the help/Fn button 13, the zoom button 16, DISP button 14, and the menu button 15 are read as the selectable portions from SRAM 41. In this case, the replay button 17 and the delete button 18 are indicated in the camera image 109, but these buttons are not used in the photograph mode. Therefore, these buttons are not read as the selectable portions. However, all selectable portions are also shown in the camera image 108 or 109, when the help image R12 or R13 is indicated.

When the primary help image R12 is indicated, the character image has a character list 117. The character list 117 consists of text characters relating to the selectable portions. The text characters are the names of the selectable portions. In this case, the text characters are used to describe all selectable portions read from SRAM 41 when the primary help image R12 is indicated. In the camera image 108, the connection lines 110 are indicated. Each of the connection lines 110 connects each of the selectable portions with each of the text characters corresponding to the selectable portion. Due to this, the user can understand the relation between the text characters and the selectable portions. And then, the text character corresponding to the selected portion is encircled by a selected frame 119. Therefore, the selected portion is distinguished from other selectable portions. Due to this, the user can select the selected portion from the selectable portions easily, by looking at the character list 117 and the selected frame 119.

The primary help image R13 is similar to the primary help image R12. The character image also has a character list 117. The character list 117 also consists of text characters relating to the selectable portions. Therefore, the primary help image R13 will not be explained herein.

If the OK switch 53 is activated, the selected portion is fixed and the primary help image R11, R12, or R13 stops being indicated. And then, a secondary help image R21, R22, or R23 starts being indicated instead of the primary help image R11, R12, or R13 on the LCD 11. The secondary help image R21, R22, or R23 has an explanation image 161. The explanation image 161 is indicated to explain the function relating to the selected portion which is fixed by the OK switch 53. Due to this, the user can understand the function relating to the selected portion.

The explanation image 161 is indicated on both the image indicating field A and the character indicating field B. Namely, the explanation image 161 occupies the combination field (third field) of the image and character indicating fields A and B. In other words, the explanation image 161 occupies a far bigger field than each of the fields A and B. Therefore, it is easy for the user to see the written information explaining the function of the control member on the LCD 11. Additionally, a large number of the words can be listed on the explanation image 161, so that the explanation image 161 can provide many types of explanations.

Further, if the help switch 55 is activated when the primary help image R11, R12, or R13 is indicated on the LCD 11, the digital camera 10 returns to the easy photograph mode from the photograph help mode. If the help switch 55 is input when the secondary help image R21, R22, or R23 is indicated on the LCD 11, the image indicated on the LCD 11 is changed from the secondary help image R21, R22, and R23 to the primary help image R11, R12, and R13 respectively.

Further, the footer field C2 indicates the functions of the help button and OK button in the primary and secondary help images. And the header field C1 does not indicate anything in the secondary help image.

Furthermore, the images indicated in the field A, B, C1, and C2 are read from SRAM 41 as described below.

Figure 5:
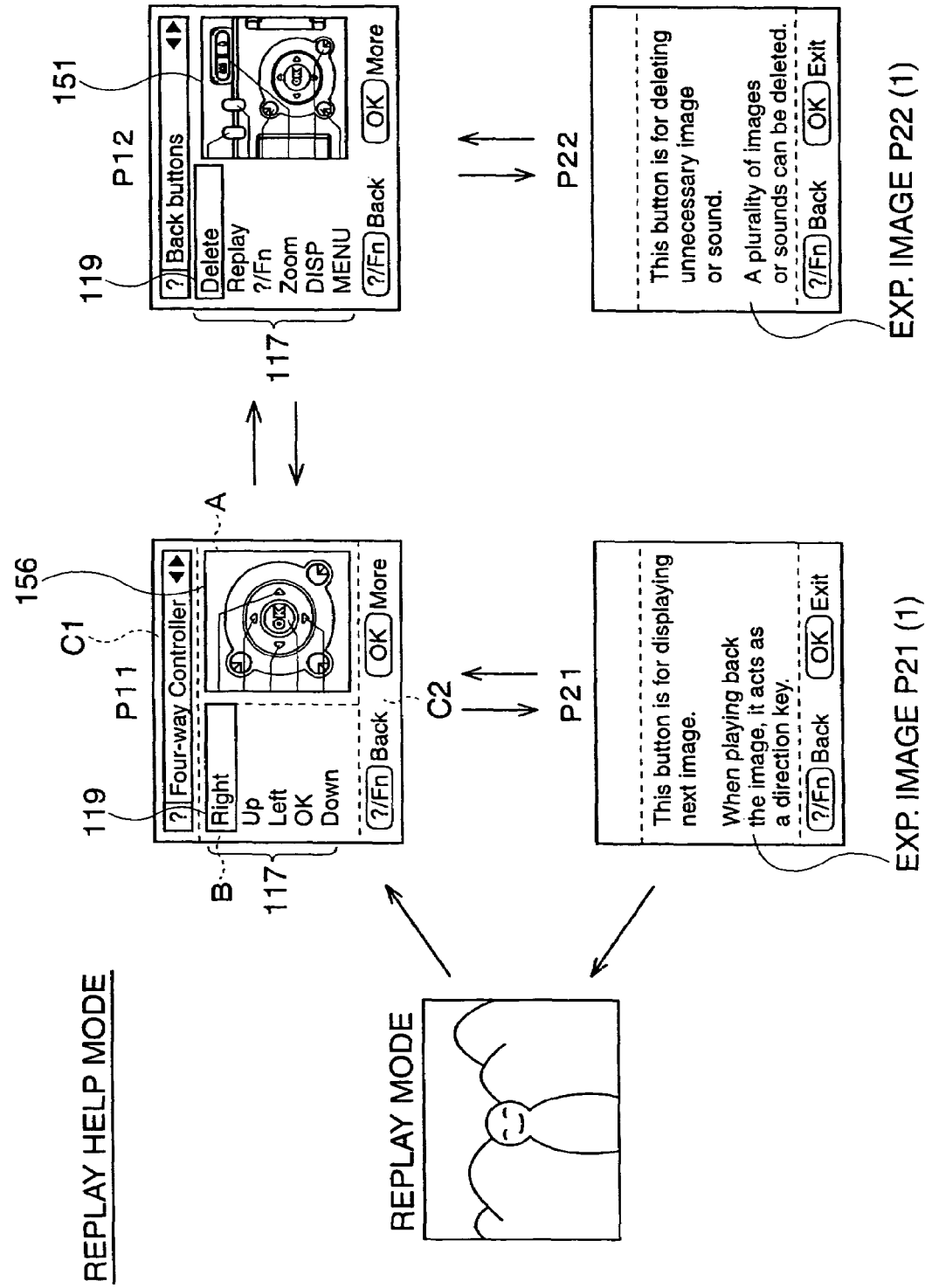
FIG. 5 is an outline, showing the details of a replay help mode.

FIG. 5 is an outline, showing the details of a replay help mode. When the digital camera 10 is in the replay mode, the digital camera 10 enters the replay help mode as if the help switch 55 is activated. The primary and secondary help images in the replay help mode are indicated on the LCD 11 in a similar way to that in the photograph help mode.

In the replay help mode, a fourth camera image 156, or a fifth camera image 151 is indicated in the image indicating field A as the camera image, in the primary help images P11 and P12. The fourth camera image 156 shows the four-way controller 12 and the fifth camera image 151 shows the back button group which consists of buttons provided on the back surface 80 of the digital camera 10. However, the mode dial 19 is not used in the replay mode, so the camera image like the first camera image 107 which shows the mode dial 19 is not indicated in the replay help mode. Namely, the camera images are read according to the mode the digital camera 10 enters. Therefore, the camera image read from the SRAM 41 in the replay mode is different from the camera image read from SRAM 41 in the photograph mode.

In the replay help mode, the selectable portions are read from the SRAM 41, similar to in the photograph help mode. When the primary help image P11 is indicated on the LCD 11, the up, down, right, and left buttons of the four-way controller 12 and the OK button 21 are read from the SRAM 41 as the selectable portions. When the primary help image P12 is indicated on the LCD 11, the replay button 17 and delete button 18 in addition to the help/Fn button 13, the zoom button 16, the DISP button 14, and the menu button 15 are read from the SARM 41 as the selectable portions. Namely, the selectable portions read from the SDRM 41 in the replay help mode are different from the selectable portions in the photograph help mode.

The character images in the help images P11 and P12 have the character list 117. When the primary help image P11 or P12 is indicated on the LCD 11, the list 117 shows the characters relating to all the selectable portions read in the help image P11 or P12, in a similar way to that in the photograph help mode.

In this case, the image indicated on the LCD 11 is changed to or from the primary help images P11-P12 according to the operation of the left or right button. When the primary help image P11 or P12 is indicated on the LCD 11, the selected portion is changed according to the operation of the up or down button. The character relating to the selected portion is encircled by the character frame 119, in a similar way to that in the photograph mode.

When the primary help image P11 or P12 is indicated on the LCD 11, the selected portion is fixed and the primary help image P11 or P12 stops being indicated if the OK switch 53 is activated. And then, the secondary help image P21 or P22 starts being indicated instead of the primary help image P11 or P12 on the LCD 11, in a similar way to that in the photograph help mode. The explanation image 161 of the secondary help image P21 or P22 is indicated, and an explanation of the function relating to the selected portion which is fixed by acting the OK switch 53 is given. Namely, if the selected portion is fixed to the right button, the explanation image 161 shows the explanation image for function of the right button in the replay mode. In this case, the explanation image 161 explains the function corresponding to the selected mode (the replay mode). Therefore, the explanation in the replay help mode is different from that in the photograph mode, even if the same selected portion is selected.

Figure 6:
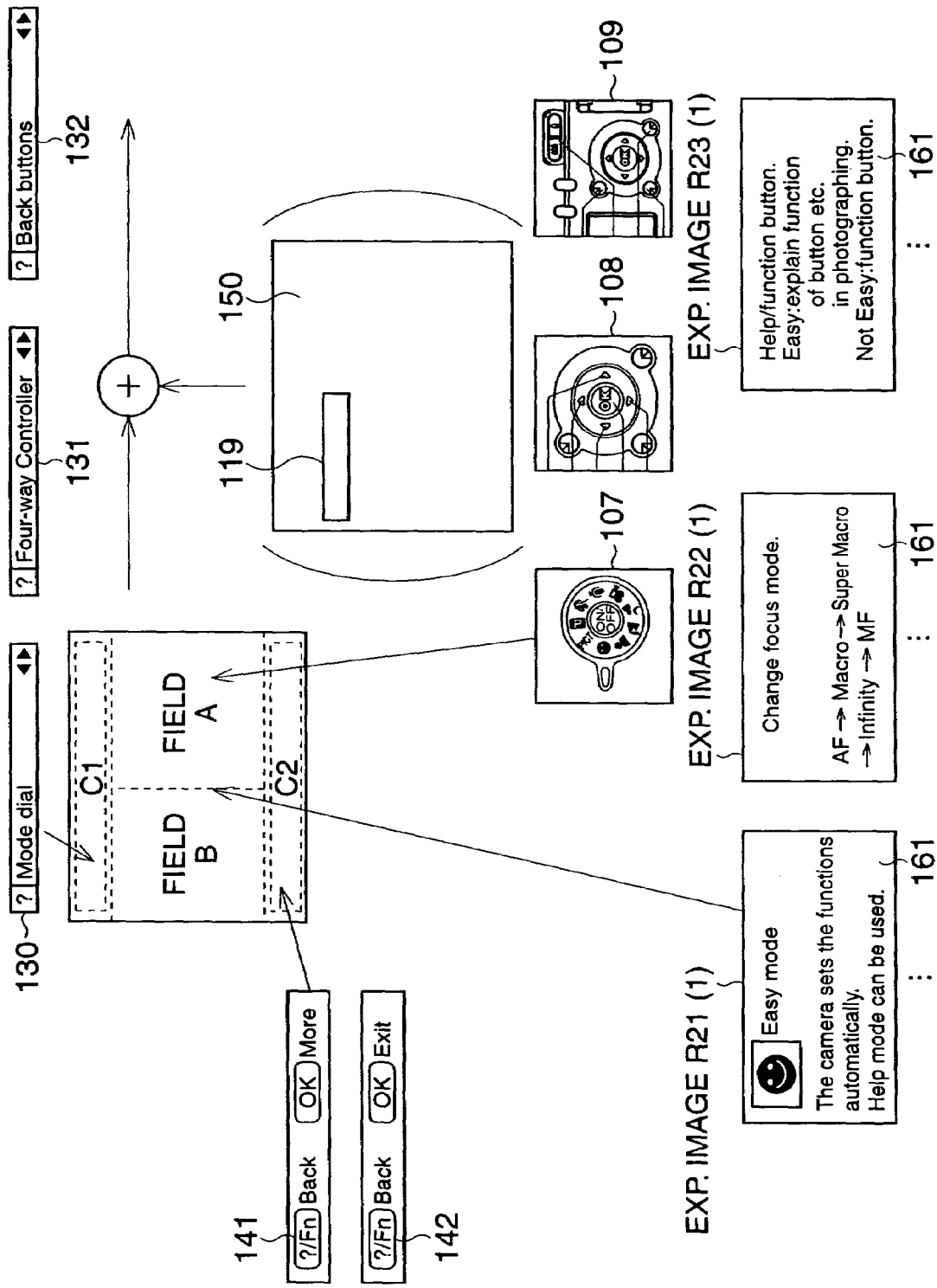
FIG. 6 is an outline, showing a method for synthesizing the primary and secondary help images.
Figure 7:
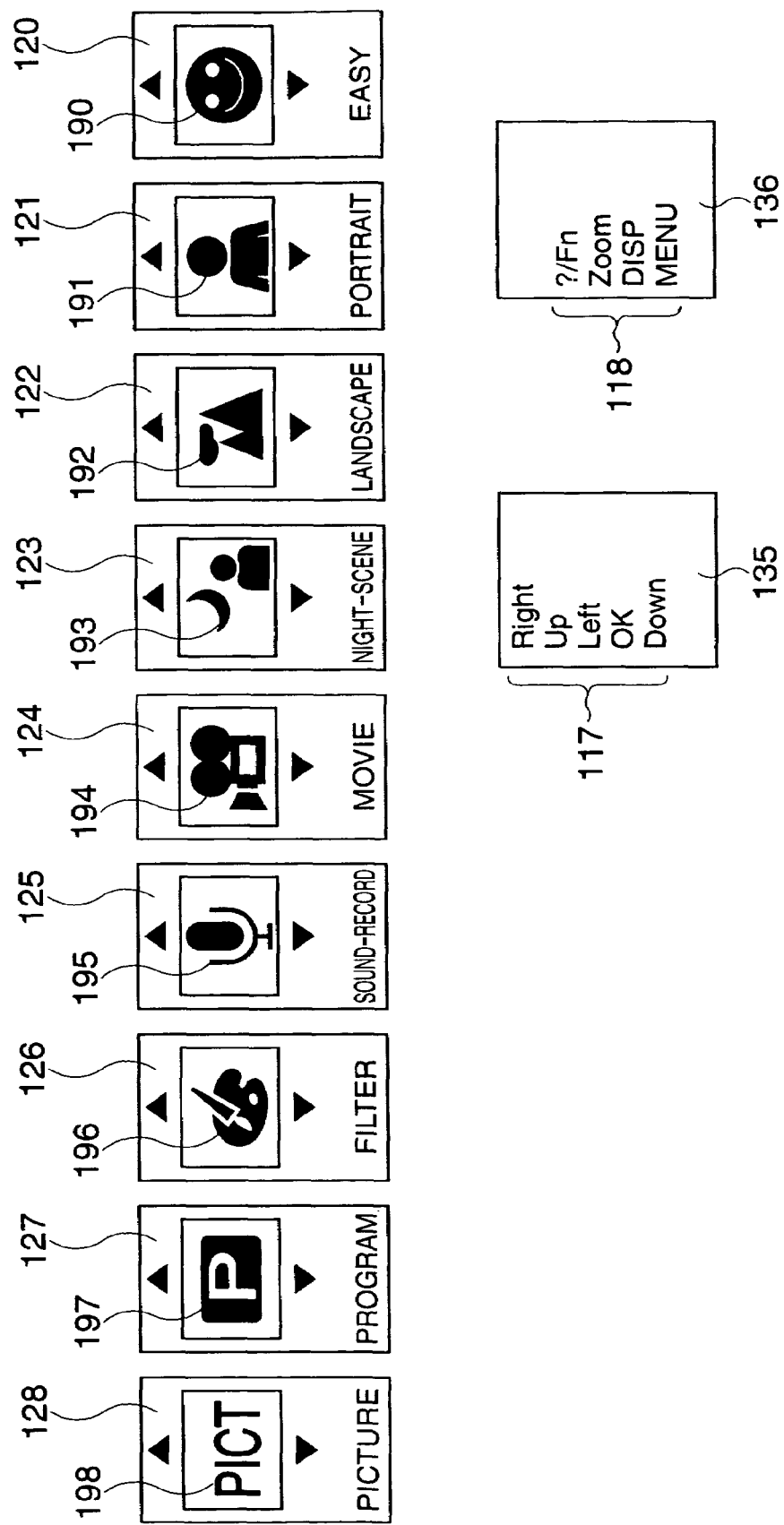
FIG. 7 is the list of character images in the photograph help mode.

FIG. 6 shows a method for synthesizing the primary and secondary help images. FIG. 7 shows the list of character images. The method for synthesizing the primary and secondary help images will be shown below using FIGS. 6 and 7. The indicating field of the LCD 11 is divided into the fields A, B, C1, and C2 as described above. The plurality of images for indicating in the fields A, B, C1, and C2 have been read from the EEPROM 90 and are stored in the SRAM 41 in advance. Then, one image selected from the plurality of the images is indicated on each of the fields A, B, C1, and C2.

Each of the images indicated in each of fields A, B, C1, and C2 is determined according to a control ID (Rmn(s)) of the control tables as shown in Tables 1, 2, 3, and 4. Further, these Table 1, 2, 3, and 4 are read from the EEPROM 90 and are stored in the SRAM 41 in advance. The selected portion is also determined according to the control ID, similarly. Furthermore, Tables 1-4 are shown in FIGS. 8-11.

When the digital camera 11 is in the easy mode, the control ID is determined as R11(1) if the help switch 55 is activated. In this case, the digital camera 10 enters the photograph help mode and the selected portion is determined to be the portion where "Easy Symbol" is applied. Then, the first camera image 107, the character A image 120, and, first header and footer images, are read from SRAM 41 according to the control ID R11(1), and these images are indicated in the fields A, B, C1, and C2 respectively. Therefore, the primary help image R11 as shown in the FIG. 4, is indicated on the LCD 11 in the beginning state.

If the up or down button of the four-way controller 12 is pushed, "s" in the control ID (Rmn(s)) is changed to a number from 1-9, so that the selected portion is changed together as shown in Table 1. For example, if "s" is changed to "2" by the operation of the up or down button, the selected portion is changed to the portion where the "Portrait Symbol" is applied. And then, the character image is changed from the character A image 120 to the character B image 121, and the images which are indicated in the other fields A, C1, and, C2 are not changed.

If the right or left button of the four-way controller 12 is pushed, "n" in the control ID (Rmn(s)) is changed to a number from 1-3, and "s" in the control ID is changed to "1". Therefore, the images indicated in the fields A, B, and C1 are changed and the selected portion is changed according to Table 1. For example, if "n" is changed to "2" according to an operation of the left or right button, "s" is changed to "1" and the control ID is determined as R12(1). Therefore, the second camera image 108, the four-way controller character image 135, the second header image 131, and the first footer image 141 are indicated in the fields A, B, C1, and C2 respectively, so that the help image R12 as shown in FIG. 4 is indicated on the LCD 11.

If "n" in the control ID Rmn (s) is "2", a selected position image 150 is added to the indicated field of the LCD 11. The selected position image 150 contains the selected frame 119 which encircles the character corresponding to the selected portion. In this case, if the up or down button is pushed, "s" is changed to a number from 1-5 and the selected portion is changed. The selected position image 150 is changed according to the selected portion. Namely, the position where the selected frame 119 is indicated is changed as the selected frame 119 encircles the character corresponding to the selected portion. Further, when "n" in the control ID is "3", the primary help image R13 is synthesized, in a similar way to that described above.

If the OK switch 53 is activated, "m" in the control ID is changed to "2" from "1". Namely, when the primary help image R11, R12, or R13 is indicated on the LCD 11, the selected portion is fixed if the OK button 21 is pushed. Then, the explanation image 161 is indicated in the fields A and B. For example, if the portion where "Easy Symbol" is applied is fixed as the selected portion, the control ID is determined to be R21(1) so the explanation image for the function of the easy mode is indicated in the fields A and B. In this case, nothing is indicated in the field C1 but a second footer image 142 is indicated in the field C2 as shown in Table 2.

When the digital camera 10 is in the replay help mode, the control ID becomes Pmn (s). But the method for synthesizing the primary and secondary help images is the same as that above. When the digital camera 10 is in the replay help mode, the digital camera is controlled by using Tables 3 and 4 as shown in FIGS. 10 and 11.

Further, in this embodiment, the character image which is stored in the EEPROM 90 in advance, is read from the EEPROM 90, and is then indicated on the field B. However, the character image does not have to be stored in the EEPROM 90 in advance when the character image consists of a text character. In this case, the text character image can be generated in the DSP 30 and can then be indicated on the field B.

Similarly, when the explanation image consists of text, the explanation image does not have to be stored in the EEPROM 90 in advance. In this case, the explanation image can be generated in the DSP 30 and can then be indicated on the fields A and B.

Figure 12:
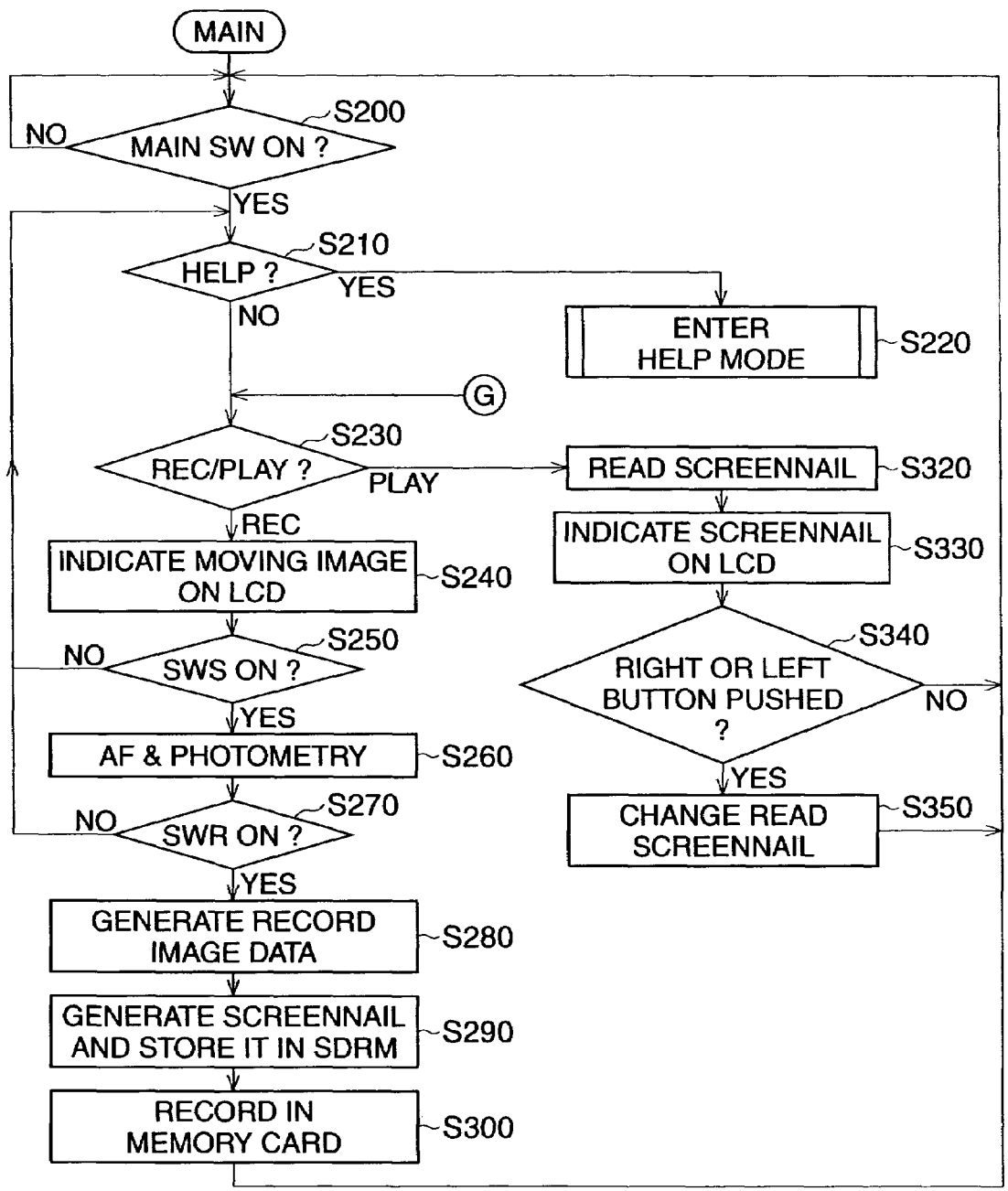
FIG. 12 shows a flowchart of the routine in the digital camera.

FIG. 12 shows a flowchart of the routine in the digital camera 10. In this flowchart, whether the main switch 54 is in the ON-state is determined at first. If it is determined that the main switch 54 is in the ON-state, this routine goes to step S210. If it is determined that the main switch 54 is in the OFF-state, this routine waits until the main switch 54 is changed to the ON-state.

At step S210, whether the help switch 55 is in the ON-state is determined. If it is determined that the help switch 55 is in the ON-state, the routine goes to step S220 and digital camera 10 enters the help mode as shown in FIGS. 13-18. If the help switch 55 is in the OFF-state, the routine goes to step S230. At step S230, whether the REC/PLAY switch 38 is in the replay mode state or in the photograph mode state is determined. If it is determined that the REC/PLAY switch 38 is in the photograph mode state, the routine goes to step S240 and the digital camera 10 enters the photograph mode. If the it is determined that REC/PLAY switch 38 is in the replay mode state, the routine goes to step S320 and the digital camera 10 enters the replay mode.

In the photograph mode, at step S240 the image signal sent from the CCD 36 is indicated on the LCD 11 as a moving image at first. Next, at step S250, whether the SWS switch 32 is in the ON-state or OFF-state is determined. If it is determined that the SWS stitch 32 is in the OFF-state, the routine goes back to step S210.

If the SWS switch 32 is in the ON-state, namely if the release button is half-pushed, at step S260 the distance between the object and digital camera 10 is measured and then the focus of the lens is adjusted by the focusing lens driver 49. Further, the luminance of the object is detected at step S260. Next, whether the SWR switch 33 is in the ON-state is determined at step 270. If it is determined that the SWR switch 33 is in the OFF-state, the routine goes back to step S210. If it is determined that the SWR switch 33 is in the ON-state, namely if the release button is fully-pushed, the object is taken as a still picture. Namely, at first, the image signal generated in the CCD 36 is converted to recorded image data and the recorded image data is memorized in the SRAM 41 temporarily at step S280. Next, at step S290, the image signal generated at the CCD 36 is converted to a screennail, and the screennail is temporarily stored in the SRAM 41. The recorded image and the screennail memorized in the SRAM 41 are read and are stored in the memory card 42. After taking a still picture, the routine goes back to step S200.

On the other hand, if it is determined that the digital camera 10 enters the replay mode at step S230, at first the screennail stored in the memory card 42 is read at step S320. In this case, the screennail read from the memory card 42 is determined at step S350. Otherwise, unless the screennail read is determined at step S350, the screennail corresponding to the recorded image which is memorized latest is read at step S320. Next, this read screennail is indicated on the LCD 11 at step S330. Whether the right or left button is pushed is determined at step S340. If it is determined that the right or left button is pushed, the routine goes to step S350. Unless it is determined that the right and left buttons are pushed, the routine goes back to step S210. At step S350, the screennail read at step S320 is changed according to whether the right or left button is pushed and then the routine goes back to step S200.

Figure 13:
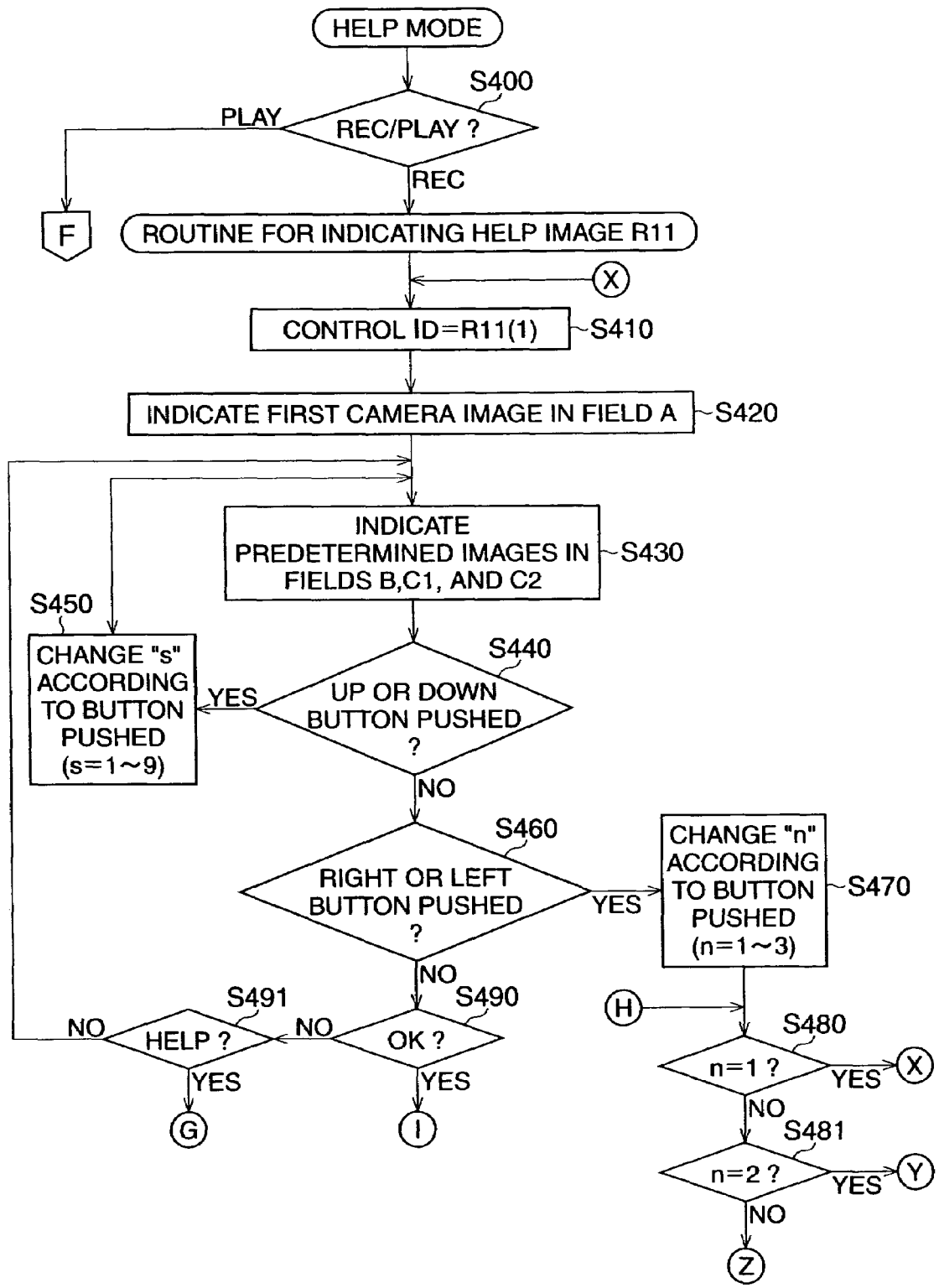
FIG. 13 shows the routine for indicating a help image R11.
Figure 15:
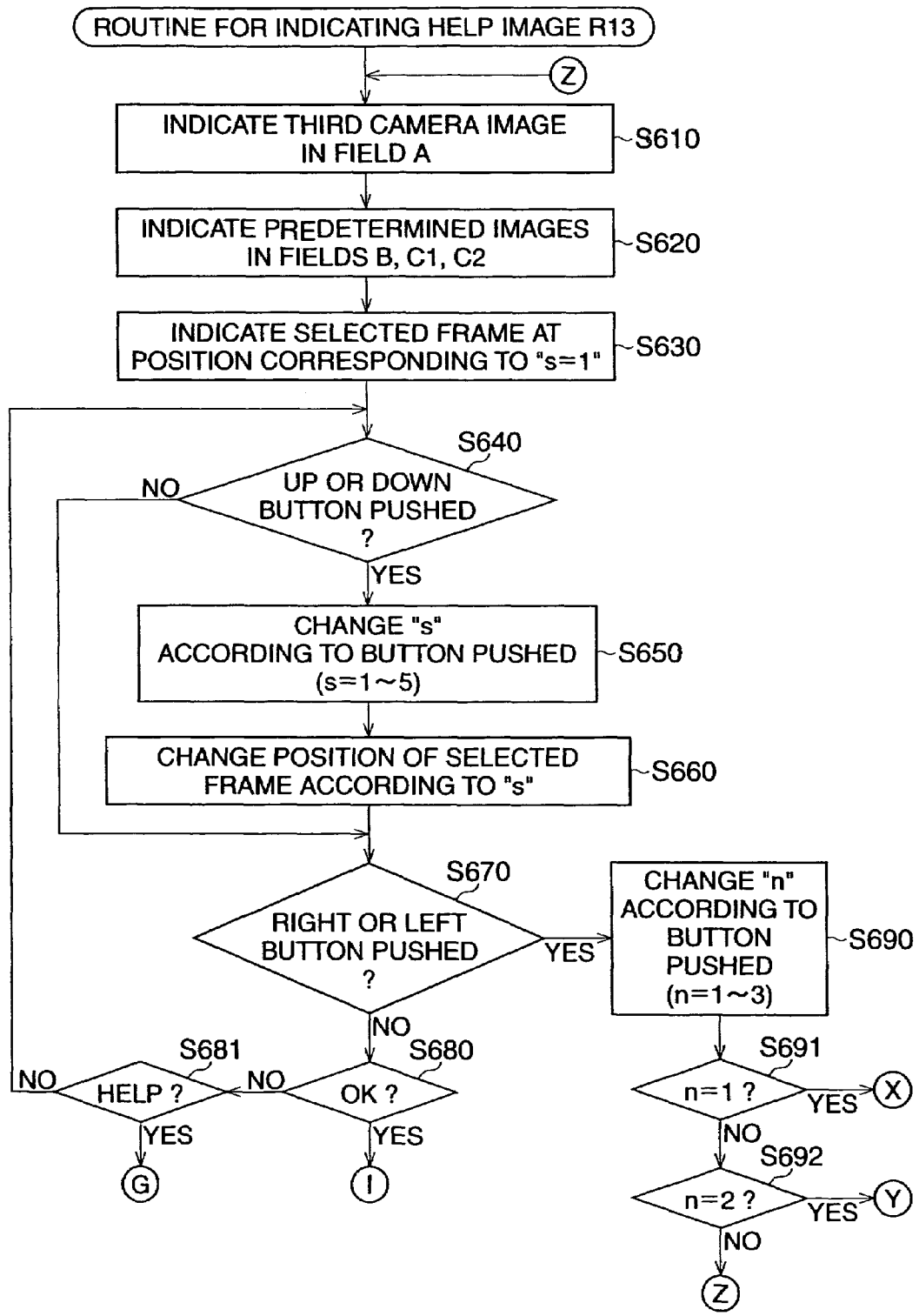
FIG. 15 shows the routine for indicating a help image R13.
Figure 16:
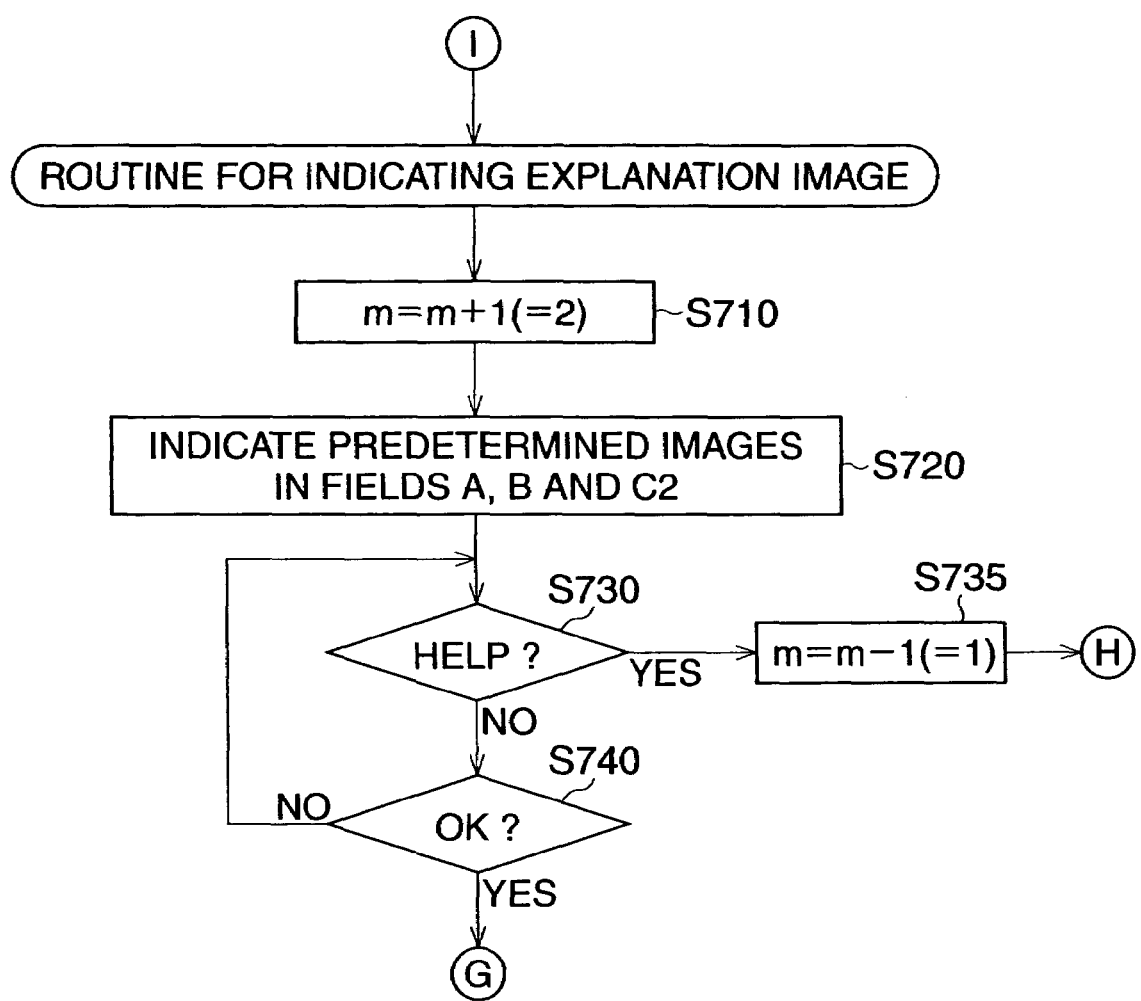
FIG. 16 shows the routine for indicating an explanation image in the photograph help mode.
Figure 17:
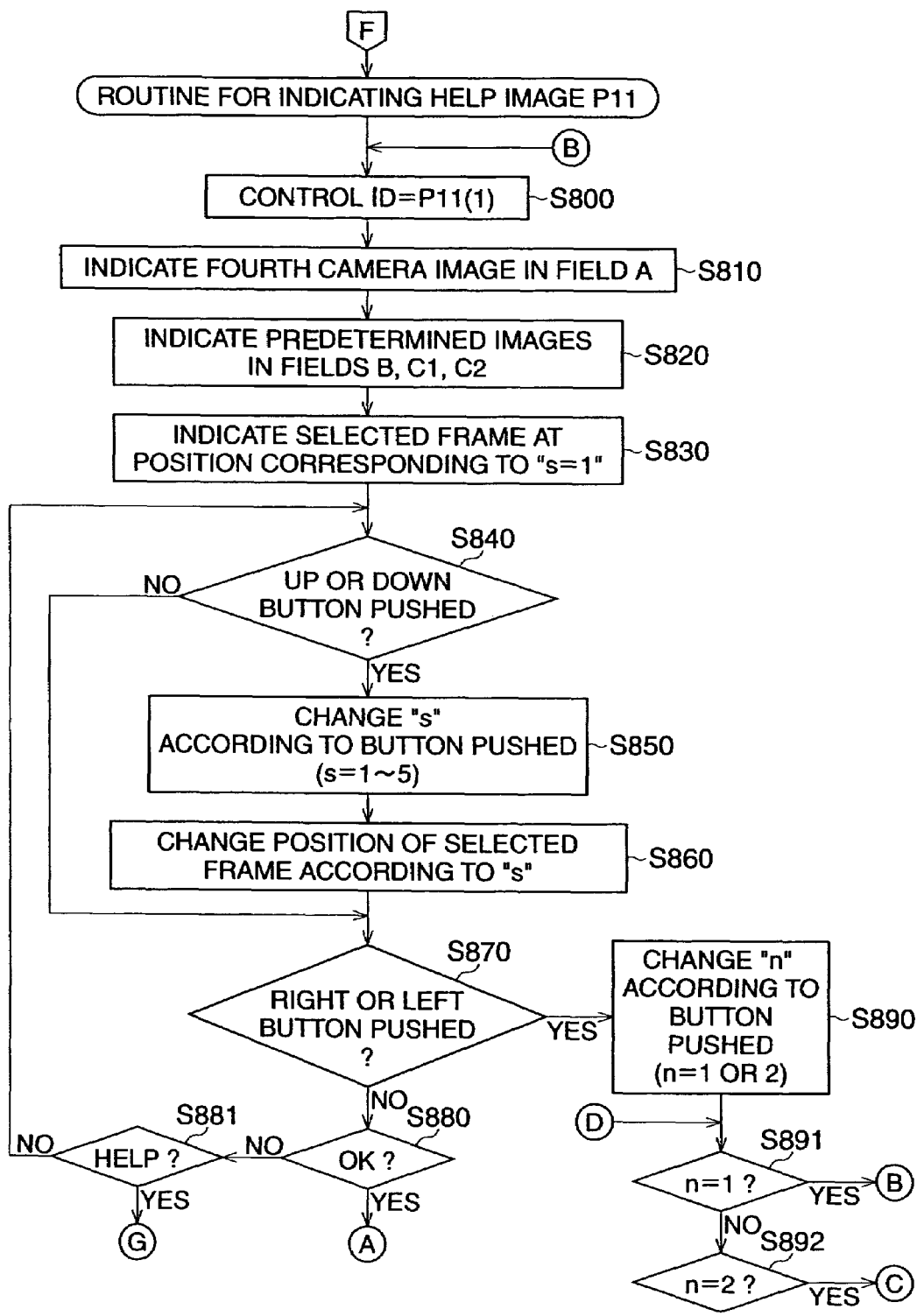
FIG. 17 shows the routine for indicating a help image P11.

FIGS. 13-19 show flowcharts of the help mode routine. The digital camera 10 enters the help mode, if the routine goes to step S220 as described above. When the digital camera 10 enters the help mode, at first whether the REC/PLAY switch 38 is the photograph mode state or the replay mode state is determined at step S400. If it is determined that the REC/PLAY switch 38 is in the photograph mode state, the routine goes to step S410 and becomes the routine for indicating the help image R11 as shown in FIG. 13. If it is determined that the REC/PLAY switch 38 is in the replay mode state, the routine goes to step S800 and becomes the routine for indicating help image R21 as shown in FIG. 17. Namely, when the digital camera 10 is in the photograph mode (the easy mode), the help image R11 is indicated, and the digital camera 10 enters the photograph help mode if the help switch 55 is input. When the digital camera 10 is in the replay mode, the help image P11 is indicated and the digital camera 10 enters the replay help mode if the help switch 55 is activated.

In the routine for indicating help image R11, at first the control ID is set to R11(1) at step 410 as shown in FIG. 13. Next, the first camera image 107 is indicated in the image indicating field A according to the control ID at step S420. Next, at step S430, images are indicated in fields B, C1 and C2 according to the control ID. At the beginning state, the control ID is R11(1), therefore, the character A image 120 is indicated in the field B and the first header image 130 and the first footer image 141 are indicated in C1 and C2, respectively. The selected portion is the portion where the Easy Symbol 190 is applied as shown in Table 1 and the character A image 120 shows the "Easy Symbol".

At step S440, whether the up or down button is pushed is determined. If it is determined that the up or down button has been pushed, the routine goes to step S450. At step 450, "s" of the control ID Rnm(s) is changed to a number from 1-9 according to whether the up or down button is pushed. For example, if "s" is changed to "2", the character B image 121 is indicated in the field B as shown in Table 1. If the up or down button is not pushed, the routine goes to step S460.

At step S460, whether the right or left button is pushed is determined. If it is determined that the right or left button has been pushed, the routine goes to step S470. At step S470, "n" of the control ID is changed to a number from 1-3 according whether the right or left button is pushed and the routine goes to step S480. At step S480, whether the "n" is "1" is determined. If it is determined that "n" is "1", the routine goes back to step S410. Unless "n" is "1", the routine goes to step S481. At step S481, whether the "n" is "2" is determined. If "n" is "2", the routine goes to step S510 and becomes the routine for indicating the help image R12. Unless "n" is "2" namely "n" is "3", the routine goes to step S610 and becomes the routine for indicating the help image R13.

At step S460, unless it is determined that the right and left buttons have not been pushed, the routine goes to step S490. At step S490, whether the OK switch 53 has been activated is determined. If it is determined that the OK switch 53 has been activated, the routine goes to step S710 and becomes the routine for indicating the explanation image as shown in FIG. 16 as described below. Unless it is determined that the OK switch 53 is input, the routine goes to step S491. At step S491, whether the help switch is activated is determined. If it is determined that the help switch 55 is activated, the digital camera 10 exits the photograph help mode and the routine goes back to step S230 as shown in FIG. 12. Unless it is determined that the help switch 55 is input, the routine goes back to step S430.

Figure 14:
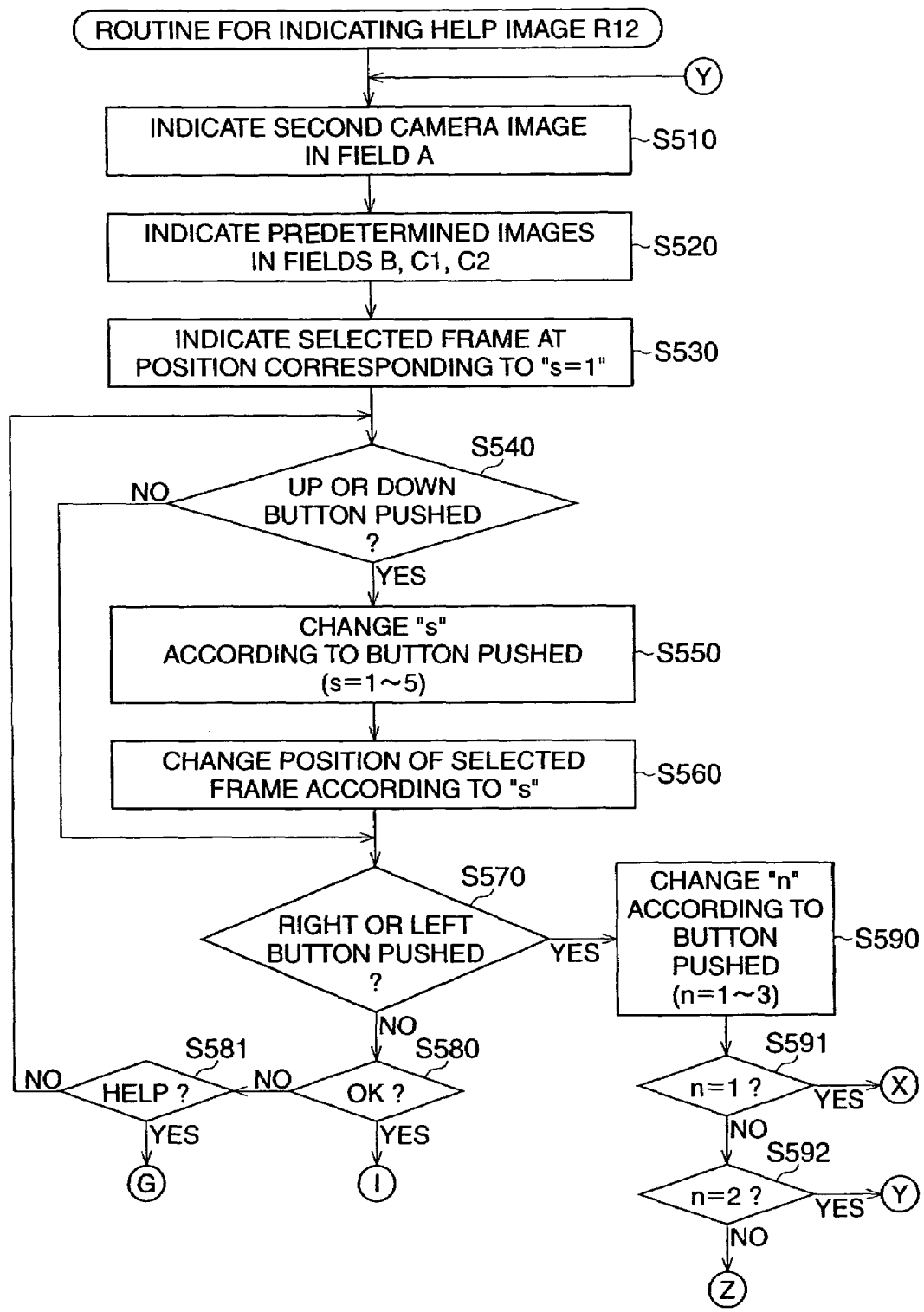
FIG. 14 shows the routine for indicating a help image R12.

FIG. 14 shows the routine for indicating help image R12. In this routine, at first the second camera image 108 is indicated in the field A at step 510. Next, the four-way controller character image 135 is indicated in the field B at step S520. And the second header image 131 and the first footer image 141 are indicated in the fields C1 and C2 respectively at step S520. Next, the selected frame 119 is indicated at the position corresponding to the value of "s" of control ID Rmn(s) at step S530. Namely, at the beginning state, the "s" is "1", therefore, the selected portion is the right button and the selected frame 119 encircles the right button character in the field B as shown in FIG. 4.

At step S540, whether the up or down button has been pushed is determined. If it is determined that the up or down button has been pushed, the routine goes to step S550. Unless it is determined that the up or down button has been pushed, the routine goes to step S570. At step 550, "s" of the control ID Rnm(s) is changed to a number from 1-5 according to whether the up or down button is pushed. After changing the value of "s", the position of the selected frame 119 is changed according to the value of "s" and then the routine goes to step S570. For example, if "s" is changed to "2", the selected frame 119 encircles the character of the "Up Button" in the field B. In this case, the selected portion is changed to the "up button" from the "right button" as shown in Table 1.

At step S570, whether the right or left button is pushed is determined. If it is determined that the right or left button has been pushed, the routine goes to step S590. Unless it is determined that the right and left buttons have been pushed, the routine goes to step S580. The routines after step S590 and after step S580 are similar to the routines after step S470 and after step S490 respectively. Therefore, they will not be explained herein.

FIG. 15 shows the routine for indicating help image R13. This routine is similar to the routine for indicating help image R12 shown in FIG. 14. Therefore, this routine will not be explained herein.

FIG. 16 shows the routine for indicating the explanation image in the photograph help mode. As described above in step S490, S580, and S680, namely when the help image R11, R12, or R13 is indicated, if the OK switch 53 is input, the routine goes to step S710 and the routine for indicating the explanation image starts. At step S710, "m" of the control ID Rmn(s) is changed from "1" to "2". Next, the images are indicated in the fields A, B, C1, and C2 according to the control ID Rmn(s) at step S720. For example, if the selected position is the right button, the control ID becomes R22(1) and the explanation image for the function of right button (R) is indicated in the combined field of fields A and B. The explanation image for the function of right button (R) explains the function of the right button in the photograph mode.

Next, whether the help switch 55 is activated is determined at step S730. If it is determined that the help switch 55 is activated, "m" of the control ID Rmn(s) is then changed from "2" to "1" at step S735 and the routine goes back to step S480. If it is determined that the help switch 55 is not activated, the routine goes to step S740. At step S740, whether the OK switch 53 is activated is determined. If it is determined that the OK switch 53 is activated, the routine goes back to step S230. If it is determine that the OK switch 53 is not activated, the routine goes back to step S730.

Figure 18:
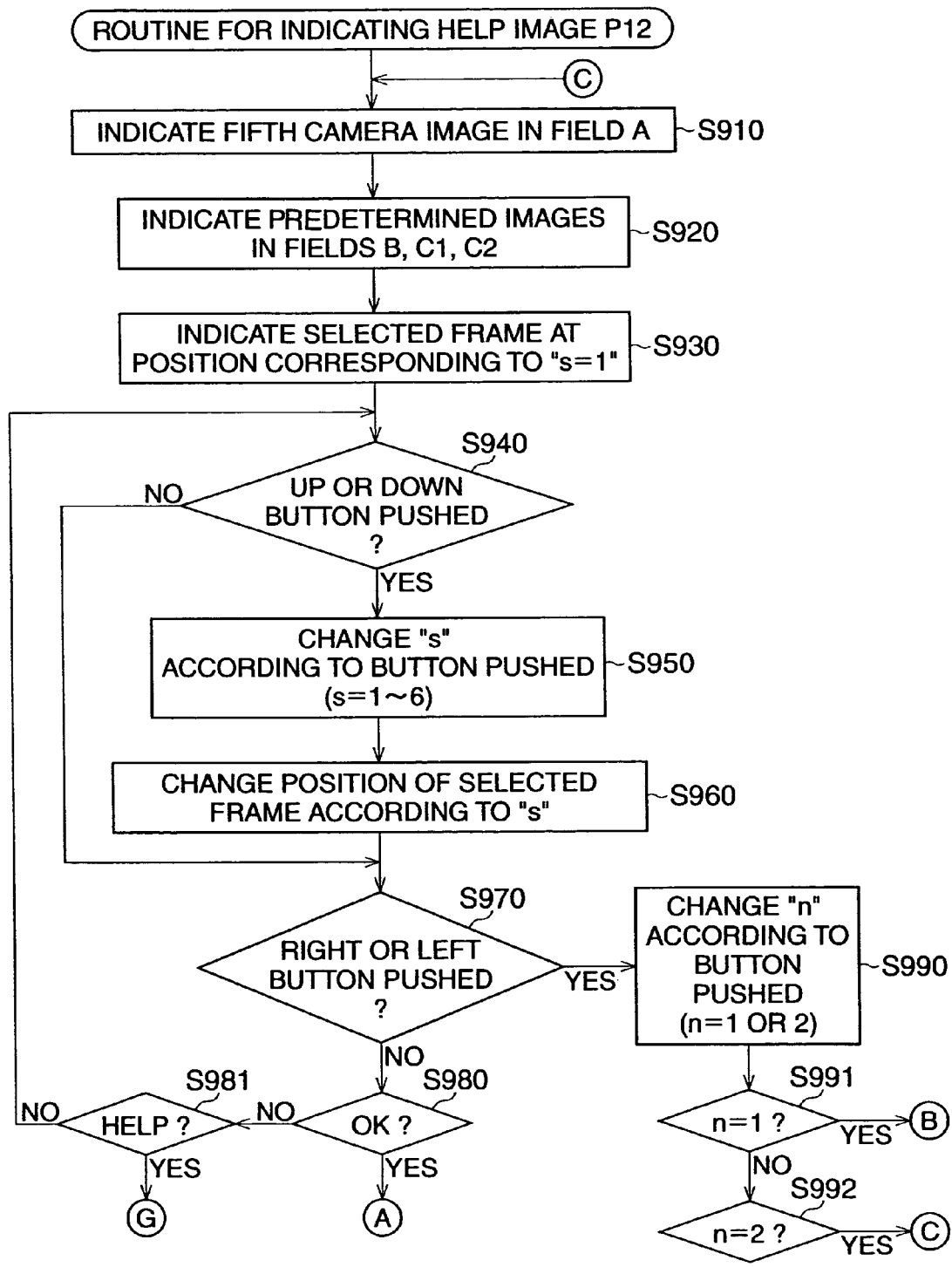
FIG. 18 shows the routine for indicating a help image P12.
Figure 19:
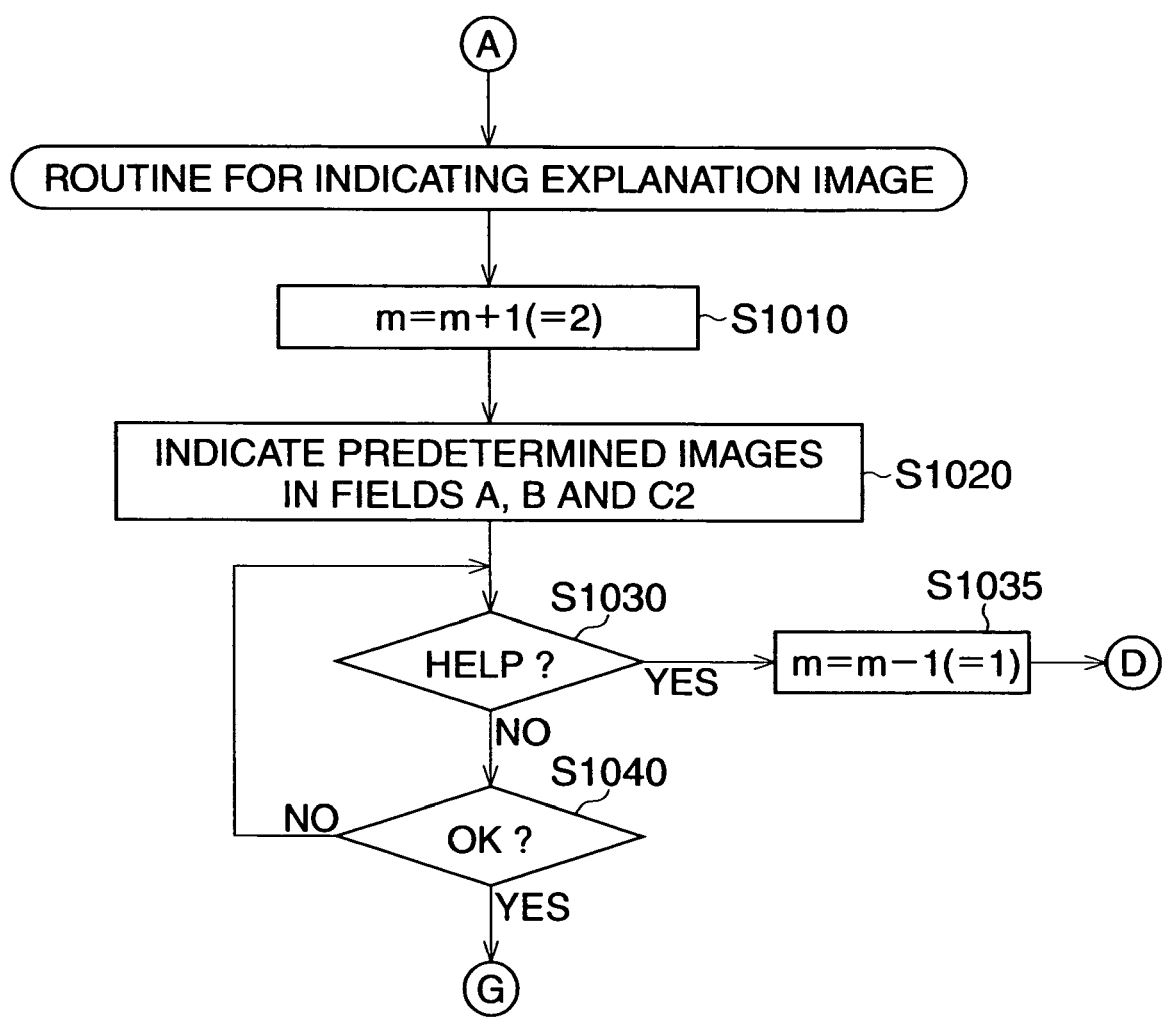
FIG. 19 shows the routine for indicating an explanation image in the replay help mode.

FIGS. 17-19 show the routine in the replay help mode. When the selected mode is the replay mode, if the help switch 55 is activated, the digital camera 10 enters the replay help mode and the routine for indicating help image P11 starts at Step S800. At step S800, the control ID Pmn(s) is determined to be P11(1). After this step, the routine goes to step S810. The routine from Step S810 to step S 890 is similar to the routine for indicating help image R12 as shown in FIG. 14. Therefore, these steps will not be explained herein.

FIG. 18 shows the routine for indicating the help image P12. This routine is similar to the routine for indicating the help image P11 as shown in FIG. 17. Therefore, this routine will not be explained herein. Further, in the replay help mode, the control ID P1n(s) is changed based on Table 3. And the help image P11 and P12 in the replay help mode are indicated according to Table 3.

FIG. 19 shows the routine for indicating the explanation image in the playing help image. This routine is similar to the routine for indicating the explanation image in the photograph mode as shown in FIG. 16. Therefore, this routine will be not explained herein. Further, in the replay help mode, the control ID P2n(s) is changed based on Table 4. And the explanation image in the replay help mode is indicated according to Table 4. Therefore, the explanation image in the replay help mode is different from that in the photograph help mode even though the selected portion is the same. For example, if the selected portion is the right button in the photograph help mode, the explanation image explains the function of the right button in the photograph mode. On the other hand, if the selected portion is the right button in the replay help mode, the explanation image explains the function of the right button in the replay mode.

Further, the frequency of use of the mode dial 19 is higher than that of other control members in the photograph mode. And the frequency of use of the four-way controller 12 and the OK button 21 is higher than that of other control members in the replay mode. Therefore, the first camera image 107 or the forth camera image 156 is indicated at first, when the digital camera 10 enters the help mode.

Additionally, each of the camera images shows a part of the outside of the digital camera 10 in this embodiment. However, the camera image can show the whole outside of the digital camera 10.

Furthermore, "character" includes "words", "numerals", "symbols", "symbol marks", "marks", "icons", "figures", "signs" and so on.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-025460 (filed on Feb. 2, 2004) which is expressly incorporated herein, by reference, in its entirety.

The invention claimed is:

1. A portable imaging device, having a control member for controlling said portable imaging device and a display device for displaying images, said portable imaging device comprising:

a memory that stores a device image showing at least a part of an outside of said portable imaging device, said device image including a plurality of selectable portions relating to said control member;

a reading processor that reads said device image from said memory;

a first indicating processor that indicates a first image which shows a character corresponding to at least one of said plurality of selectable portions, and said device image which is read by said reading processor, on said display device;

a selection indicating processor that indicates that a selected portion has been selected from said plurality of selectable portions using said character of said first image; and a second indicating processor that indicates a second image showing a function relating to said selected portion, on said display device, instead of the first image and the display image.

2. The portable imaging device according to claim 1, wherein said selection indicating processor indicates said selected portion to distinguish said selected portion from other portions.

3. The portable imaging device according to claim 2, wherein said selection indicating processor indicates a character corresponding to said selected portion and does not indicate other characters corresponding to said selectable portions.

4. The portable imaging device according to claim 1, wherein said first indicating processor indicates all characters corresponding to said plurality of selectable portions.

5. The portable imaging device according to claim 4, wherein said first indicating processor distinguishes one character corresponding to said selected portion from all characters.

6. The portable imaging device according to claim 1, wherein said portable imaging device is in one selected mode which is selected from a plurality of modes, and said function corresponds to said selected mode.

7. The portable imaging device according to claim 6, wherein said plurality of modes includes a photograph mode for photographing and a replay mode for displaying an image photographed in said photograph mode on said display device.

8. The portable imaging device according to claim 6, wherein said plurality of selectable portions is changed according to said selected mode.

9. The portable imaging device according to claim 1, wherein said memory stores a plurality of device images, and said reading processor reads one of said plurality of device images.

10. The portable imaging device according to claim 9, wherein when said portable imaging device is in a selected mode which is selected from a plurality of modes, said reading processor reads said device images according to said selected mode.

11. The portable imaging device according to claim 1, wherein said first image includes a text character corresponding to at least one of said plurality of selectable portions.

12. The portable imaging device according to claim 1, wherein an indicating field on which said displaying device displays an image is divided into at least first and second fields.

13. The portable imaging device according to claim 12, wherein said first indicating processor indicates said device image in said first field and said first image in said second field.

14. The portable imaging device according to claim 13, wherein said first field is located at the closest position on said display device to where said control member being included in said device image is located, and said second image is adjacent to said first image.

15. The portable imaging device according to claim 14, wherein said first field includes a right side of said indicating field.

16. The portable imaging device according to claim 13, wherein said second indicating processor indicates said second image on a third field which is bigger than each of said first and second fields.

17. The portable imaging device according to claim 16, wherein said third field is a combination of said first and second fields.

18. The portable imaging device according to claim 1, wherein said second indicating processor indicates the second image in response to an indication that the selected portion has been selected.

19. The portable imaging device according to claim 1, said first indicating processor being configured to simultaneously display the first image and the device image on said display device.

20. A portable imaging device, having a control member for controlling said portable imaging device and a display device for displaying images, said portable imaging device comprising:

a memory that stores a device image showing at least a part of a casing of said portable imaging device, said device image including a plurality of selectable portions relating to said control member;

a reading processor that reads said device image from said memory;

a first indicating processor that indicates a first image, which shows a character corresponding to at least one of said plurality of selectable portions, and said device image which is read by said reading processor, on said displaying device;

a selection indicating processor that indicates, by using the character, that a selected portion has been selected from said plurality of selectable portions; and a second indicating processor that indicates a second image showing a function relating to said selected portion, on said displaying device, wherein each of the memory, the reading processor, the first indicating processor, the selection indicating processor and the second indicating processor are contained by the casing of the portable imaging device.

* * * * *